US006476584B2

United States Patent
Sakakibara

(10) Patent No.: US 6,476,584 B2
(45) Date of Patent: Nov. 5, 2002

(54) BATTERY CHARGER AND BATTERY CHARGING METHOD

(75) Inventor: Kazuyuki Sakakibara, Anjo (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 09/842,324

(22) Filed: Apr. 25, 2001

(65) Prior Publication Data

US 2001/0048289 A1 Dec. 6, 2001

Related U.S. Application Data

(63) Continuation-in-part of application No. 09/527,126, filed on Mar. 16, 2000, now Pat. No. 6,225,786.

(51) Int. Cl.⁷ .................................................. H02J 7/16
(52) U.S. Cl. ................................................. 320/150
(58) Field of Search ............................ 320/150, 151, 320/152, 153

(56) References Cited

U.S. PATENT DOCUMENTS

| 3,852,652 A | 12/1974 | Jasinskl ........................ 320/35 |
| 4,308,493 A | 12/1981 | Köthe et al. .................... 320/35 |
| 4,370,606 A | 1/1983 | Kakumoto et al. ............ 320/35 |
| 4,775,735 A | 10/1988 | Inakagata ....................... 320/35 |
| 5,241,259 A | 8/1993 | Patino et al. ................... 320/35 |
| 5,480,734 A | 1/1996 | Schulz et al. .................. 429/7 |
| 5,497,068 A | 3/1996 | Shiojima ....................... 320/35 |
| 5,592,070 A | 1/1997 | Mino ............................ 320/35 |
| 5,652,500 A | 7/1997 | Kadouchi et al. ............. 320/15 |
| 5,659,239 A | 8/1997 | Sanchez et al. ............... 320/22 |
| 5,739,673 A | 4/1998 | Le Van Suu ................... 320/31 |
| 5,767,659 A | 6/1998 | Farley ......................... 320/106 |
| 5,886,527 A | 3/1999 | Ito ............................. 324/431 |
| 5,909,101 A | 6/1999 | Matsumoto et al. ........ 320/150 |
| 5,912,547 A | 6/1999 | Grabon ....................... 320/150 |
| 6,008,628 A | 12/1999 | Brotto ......................... 320/137 |
| 6,075,347 A | 6/2000 | Sakakibara ................. 320/150 |
| 6,124,698 A | 9/2000 | Sakakibara ................. 320/110 |
| 6,133,713 A | 10/2000 | Brotto ......................... 320/150 |
| 6,191,560 B1 | 2/2001 | Sakakibara ................. 320/150 |
| 6,204,640 B1 | 3/2001 | Sakakibara ................. 320/150 |
| 6,225,785 B1 | 5/2001 | Muramatsu et al. ........ 320/150 |
| 6,275,009 B1 | 8/2001 | Sakakibara et al. ......... 320/134 |
| 6,278,261 B1 | 8/2001 | Sakakibara ................. 320/150 |

FOREIGN PATENT DOCUMENTS

| DE | 37 36 069 | 10/1987 |
| DE | 42 00 693 | 1/1992 |
| DE | 200693 | 5/1993 |
| EP | 0621 990 B1 | 6/1996 |
| EP | 0 863 599 | 2/1998 |
| JP | 05244729 A | 9/1993 |
| JP | 06121468 A | 4/1994 |
| JP | 070077865 A | 1/1995 |
| JP | 07123604 A | 5/1995 |
| JP | 07153497 A | 6/1995 |
| JP | 07284235 A | 10/1995 |
| JP | 18298140 A | 11/1996 |
| JP | 08327711 A | 12/1996 |
| JP | 10014125 A | 1/1998 |
| JP | 2000-2788756 | 10/2000 |
| WO | WO 91/08604 | 6/1991 |
| WO | WO 94/21022 | 9/1994 |
| WO | WO 95/09471 | 4/1995 |
| WO | WO 98/12789 | 3/1998 |

OTHER PUBLICATIONS

European Search Report of European Patent Application No. EP 00 10 5940 (00105940.1–2207) dated Oct. 3, 2001.
European Search Report of European Patent Application No. EP 00 10 5941 (00105941.9–2207) dated Oct. 3, 2001.

Primary Examiner—Gregory Toatley
(74) Attorney, Agent, or Firm—Lyon & Lyon LLP

(57) ABSTRACT

A temperature rise pattern is retrieved from charging time based on the difference between a battery temperature at the beginning of battery charge and a target temperature value which a battery is intended to reach (in S116). The battery is charged while adjusting a current value so that a temperature rise value becomes the temperature rise pattern (in S118 and S120). Thus, by optimizing the temperature rise pattern, it is possible to charge the battery so that the temperature at the time of the completion of battery charge becomes the target temperature value (the lowest temperature value).

26 Claims, 21 Drawing Sheets

Fig. 13
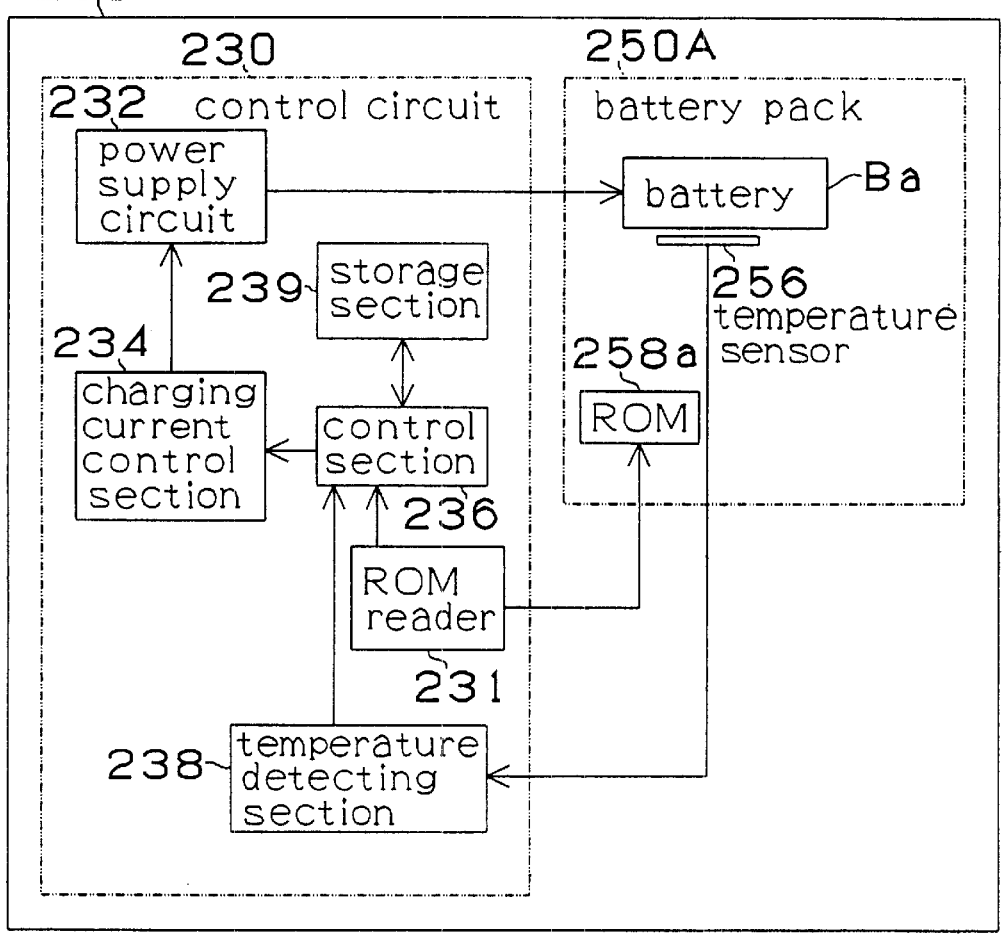
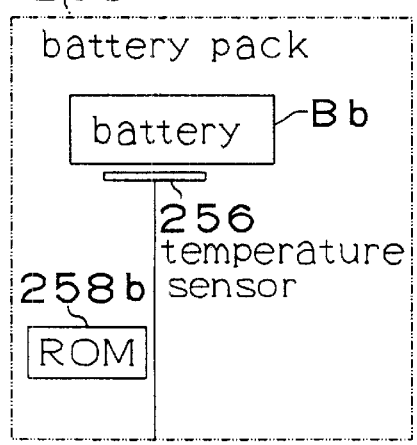

Fig. 17

| dT/dt \ \|T\| | ~T₁ | T₁~T₂ | T₂~T₃ | T₃~T₄ | T₄~T₅ | T₅~ |
|---|---|---|---|---|---|---|
| ~X₁ | I₁₁ | I₁₂ | I₁₃ | I₁₄ | I₁₅ | I₁₆ |
| X₁~X₂ | I₂₁ | I₂₂ | I₂₃ | I₂₄ | I₂₅ | I₂₆ |
| X₂~X₃ | I₃₁ | I₃₂ | I₃₃ | I₃₄ | I₃₅ (1) | I₃₆ |
| X₃~X₄ | I₄₁ | I₄₂ | I₄₃ | I₄₄ | I₄₅ (2) | I₄₆ |
| X₄~X₅ | I₅₁ | I₅₂ | I₅₃ | I₅₄ | I₅₅ | I₅₆ |
| X₆~ | I₆₁ | I₆₂ (3) | I₆₃ | I₆₄ | I₆₅ | I₆₆ |

M1

BATTERY CHARGER AND BATTERY CHARGING METHOD

CROSS REFERENCE

This application is a Continuation-in-part of U.S. patent application Ser. No. 09/527,126, now U.S. Pat. No. 6,225,786, which claims priority to Japanese patent application Ser. No. 11-081247.

BACKGROUND OF THE INVENTION

1. Field of the Invention

The present invention relates to a battery charger and a battery charging method for charging a battery and particularly relates to a battery charger and a battery charging method suited for charging a battery, such as a nickel metal hydride battery, which generates a large amount of heat while being charged.

2. Discussion of the Prior Art

Presently, a chargeable battery which can be repeatedly used for the power supply of, for example, a power tool is used. A nickel cadmium battery is popular as a battery for the power tool, and a battery charger for quickly charging the battery by applying high current thereto is used. Specifically, the battery is quickly charged in about 20 minutes and a power tool can be continuously used by switching to a battery that has been charged.

The inventor of the present invention studied improving the performance of a power tool by using a nickel metal hydride battery as a battery therefor. Although the nickel metal hydride battery has an increased charge storage capacity compared to a nickel cadmium battery, it generates high heat while being charged. If the temperature of the battery becomes high due to the generated heat, the electrodes and separators of the cells within the battery will deteriorate and battery life is shortened. Due to this, it has been impossible to quickly charge the nickel metal hydride battery with high current in a manner similar to the nickel cadmium battery stated above.

Further, the nickel metal hydride battery is less resistant against overcharge than the nickel cadmium battery. If overcharged, the battery life is shortened. It is, therefore, necessary to avoid overcharge.

Considering this, the inventor of the present invention contrived a method of controlling charging current and detecting the completion of charge based on a map for determining a current value based on the absolute temperature of the battery and a temperature rise value. With this method, however, if the number of battery cells in a battery pack increases, a battery cell positioned on the end portion of the battery pack tends to be cooled and that on the central portion thereof is difficult to cool, with the result that the completion of charge cannot be detected based on the battery temperature. Furthermore, if the temperatures of the cells in the battery pack become increasingly irregular, the life of a high temperature cell is shortened and the high temperature cell is difficult to charge. Due to this, the capacities become unbalanced among the cells and it may occur that there is a cell charged 100% and one charged 90% (high temperature cell). Here, if the capacity of the battery pack is used up to 90%, some cells have a residual capacity of 10% and the others have a residual capacity of 0% (high temperature cell). The cells of 0% residual capacity are reverse-charged by those of 10% residual capacity and the battery life is considerably shortened.

BRIEF SUMMARY OF THE INVENTION

The present invention has been made to solve the above-stated problems and an object of this invention is to provide a battery charger and a battery charging method capable of appropriately charging a battery in a short time while avoiding overheating the battery during charging.

In one embodiment of the present invention, a battery charger comprises:

a temperature detecting section for detecting a present battery temperature;

a temperature rise value outputting section for obtaining a temperature rise value from the temperature detected by said temperature detecting section;

a current value retrieving section for retrieving a current value with which the temperature rise value outputted from said temperature rise value outputting section is constant; and a charge control section for charging a battery with the current value retrieved by said current value retrieving section.

In another embodiment of the present invention, a battery charger comprises:

a storage device storing a target temperature value which a battery temperature is intended to reach;

a temperature detecting section for detecting a present battery temperature;

a temperature gradient calculating section for calculating a temperature rise gradient from charging time based on a difference between a battery temperature at the beginning of battery charge and said target temperature value held by said storage device;

a temperature rise value outputting section for obtaining a temperature rise value from the temperature detected by said temperature detecting section;

a current value retrieving section for retrieving a current value with which the temperature rise value outputted from said temperature rise value outputting section becomes said temperature rise gradient; and a charge control section for charging the battery with the current value retrieved by said current value retrieving section.

In another embodiment of the present invention, a battery charger comprises:

a storage device storing a target temperature value which a battery is intended to reach;

a temperature detecting section for detecting a present battery temperature;

a temperature rise pattern retrieving section for retrieving a temperature rise pattern for completing battery charge at said target temperature value based on a difference between a battery temperature at the beginning of the battery charge and said target temperature value held by said storage device;

a temperature rise value outputting section for obtaining a temperature rise value from the temperature detected by said temperature detecting section;

a current value retrieving section for retrieving a current value with which the temperature rise value outputted from said temperature rise value outputting section becomes said temperature rise pattern; and a charge control section for charging the battery with the current value retrieved by said current value retrieving section.

In accordance with more preferred teaching of the present invention, said temperature rise pattern is such that the temperature rise value is relatively high in a first half of battery charge and is relatively low in a second half of battery charge.

In accordance with more preferred teaching of the present invention, said temperature rise pattern is approximated polygonally.

In accordance with more preferred teaching of the present invention, said target temperature value is a value for completing the battery charge at the lowest temperature.

A battery charging method for making a battery side hold information on a target temperature value, which a battery is intended to reach, corresponding to charging time and charging the battery by means of a battery charger in accordance with the target temperature value, according to the present invention is characterized in that said battery charger comprises:

a storage device storing a temperature rise pattern for completing battery charge at the target temperature value read out from the battery side;

a temperature detecting section for detecting a present battery temperature;

a temperature rise pattern retrieving section for retrieving a temperature rise pattern from said storage device based on a battery temperature at the beginning of the battery charge and charging time;

a temperature rise value outputting section for obtaining a temperature rise value from the temperature detected by said temperature detecting section;

a current value retrieving section for retrieving a current value with which the temperature rise value outputted from said temperature rise value outputting section becomes said temperature rise pattern; and a charge control section for charging the battery with the current value retrieved by said current value retrieving section.

In accordance with more preferred teaching of the present invention, said target temperature value is a value for completing the battery charge at the lowest temperature.

A battery is charged while adjusting a current value so that a temperature rise value may be constant. This makes it possible to charge the battery so that a battery temperature at the time of the completion of charge becomes a predetermined value. It is, therefore, possible to charge a nickel metal hydride battery or the like in a short time without overheating the battery.

A temperature rise pattern is retrieved from charging time based on the difference between a battery temperature at the beginning of battery charge and a target temperature value which the battery is intended to reach and which is held by a storage device. The battery is then charged while adjusting a current value so that a temperature rise value may become the temperature rise pattern. Due to this, by optimizing the temperature rise pattern, it is possible to charge the battery so that the battery temperature at the time of the completion of charge may become a predetermined value (i.e. a minimum temperature). It is, therefore, possible to charge a nickel metal hydride battery or the like, in a short time without overheating the battery.

A temperature rise pattern is generated based upon factors such as whether the difference between battery temperature and ambient temperature is small, the battery is difficult to cool, battery capacity is almost empty, temperature rise during battery is relatively small and a temperature rise value is relatively high in the first half of the battery charge. Conversely, the temperature rise pattern may be generated based upon factors such as whether the difference between the battery temperature and the ambient temperature is large, the battery is easily cooled, temperature rise during battery charge is relatively large and the temperature rise value is relatively low in the second half of the battery charge. That is, by setting the temperature rise pattern so as to optimize the various charging conditions, it is possible to charge the battery so that the battery temperature at the time of the completion of charge may be minimized.

Since a temperature rise pattern is approximated polygonally, processing such as arithmetic processing can be easily carried out.

A target temperature value which the temperature is intended to reach is a value for completing battery charge at the lowest temperature and allows charging the battery so that a battery temperature at the completion of charge may be minimized.

Further, since the battery side holds data on the target temperature value which the battery is intended to reach, it is possible to charge different types of batteries so that temperatures at the time of the completion of charge may become the target temperature values (the lowest temperatures), respectively. In various types of battery chargers, even a battery charger capable of quickly charging a battery in, for example, 15 minutes or that capable of charging a battery in one hour, it is possible to charge the battery so that the battery temperature at the time of the completion of charge may become the target temperature value which the battery is intended to reach (the lowest temperature).

Target temperature value which the battery is intended to reach is a value for completing battery charge at the lowest temperature and allows charging the battery so that the temperature at the time of the completion of charge may be minimized.

The present invention has been made to solve the above-stated problems and another embodiment of the invention is to provide a battery charger capable of appropriately charging a battery pack including many battery cells.

In another embodiment of the invention, a battery charger dividing and charging a battery consisting of a plurality of battery cells, comprises:

a storage device storing a map, in which an allowable current value, with which the battery can be charged while a temperature rise of the battery is being suppressed, is mapped based on a battery temperature value and a battery temperature rise value;

a temperature detecting section for detecting a present battery temperature;

a temperature rise value outputting section for obtaining the temperature rise value from the temperature detected by said temperature detecting section;

an allowable current value retrieving section for retrieving the map of said storage device based on the temperature detected by said temperature detecting section and the temperature rise value outputted from said temperature rise value outputting section, and for obtaining said allowable current value;

a charging section for charging said divided battery with the allowable current value retrieved by said allowable current value retrieving section; and a charge switching section for alternately switching divided blocks to be charged by said charging section.

Another embodiment of a battery charger dividing a battery consisting of a plurality of battery cells into two or more blocks and charging the divided blocks, comprises:

a storage device storing a map, in which an allowable current value, with which the battery can be charged while a temperature rise of the battery is being suppressed, is mapped based on a battery temperature value and a battery temperature rise value, the allowable current value set at a low value if the battery temperature value is high and set at a low value if the temperature rise value is high;

a temperature detecting section for detecting a present battery temperature;

a temperature rise value outputting section for obtaining the temperature rise value from the temperature detected by said temperature detecting section;

an allowable current value retrieving section for retrieving the map of said storage device based on the temperature detected by said temperature detecting section and the temperature rise value outputted from said temperature rise value outputting section, and for obtaining said allowable current value;

a charging section for charging said divided battery blocks with the allowable current value retrieved by said allowable current value retrieving section;

a charge switching section for alternately switching the divided battery blocks to be charged by said charge section;

a charge completion determining section for determining completion of charge of each of the divided battery blocks based on whether frequency, with which the temperature detected by said temperature detecting section and the temperature rise value outputted from said temperature rise value outputting section belong to regions indicating a final charging period in the map of said storage device, is high; and a charge completing section for completing charge of the divided battery blocks based on determination of completion of battery charge by said charge completion determining section.

Another embodiment of a battery charger capable of charging a battery consisting simultaneously of a plurality of battery cells and dividing the battery into two or more blocks and then charging the divided battery blocks, comprises:

a storage device storing a map, in which an allowable current value, with which the battery can be charged while a temperature rise of the battery is being suppressed, is mapped based on a battery temperature value and a battery temperature rise value;

a temperature detecting section for detecting a present battery temperature;

a temperature rise value outputting section for obtaining the temperature rise value from the temperature detected by said temperature detecting section;

an allowable current value retrieving section for retrieving the map of said storage device based on the temperature detected by said temperature detecting section and the temperature rise value outputted from said temperature rise value outputting section, and for obtaining said allowable current value;

a charging section for charging the battery with the allowable current value retrieved by said allowable current value retrieving section; and a charge switching section for switching said charging section and charging the battery consisting of the plurality of battery cells simultaneously or charging the battery separately, wherein said charge switching section simultaneously charges the battery consisting of the plurality of battery cells at beginning of battery charge, and alternately switches the divided battery blocks and charges the divided battery blocks in a final charging period.

Another embodiment of a battery charger dividing a battery consisting of a plurality of cells into two or more blocks and charging the divided battery blocks, comprises:

a storage device storing a map, in which an allowable current value, with which the battery can be charged while a temperature rise of the battery is being suppressed, is mapped based on a battery temperature value and a battery temperature rise value, the allowable current value set at a low value if the battery temperature value is high and set at a low value if the temperature rise value is high;

a temperature detecting section for detecting a present battery temperature;

a temperature rise value outputting section for obtaining the temperature rise value from the temperature detected by said temperature detecting section;

an allowable current value retrieving section for retrieving the map of said storage device based on the temperature detected by said temperature detecting section and the temperature rise value outputted from said temperature rise value outputting section, and for obtaining said allowable current value;

a charge switching section for switching said charging section and charging the battery consisting of the plurality of battery cells simultaneously or charging the battery separately;

a final charging period determining section for determining that a battery charge period is in a final charging period based on whether or not frequency, with which the temperature detected by said temperature detecting section and the temperature rise value outputted from said temperature rise value outputting section belong to regions indicating the final charging period in the map of said storage section, is high; and a charge completion determining section for determining completion of charge of each of the divided battery blocks based on whether or not the frequency, with which the temperature detected by said temperature detecting section and the temperature rise value outputted from said temperature rise value outputting section belong to the regions indicating the final charging period in the map of said storage section, is high, wherein said charge switching section simultaneously charges the battery consisting of the plurality of battery cells at beginning of battery charge and, if the battery charge period is determined to be in the final charging period by said final charging period determining section, alternately switches the battery divided by the charge switching section and charges the battery until said charge completion determining section determines the completion of charge.

Another embodiment of a battery charger obtains an allowable current value with which a battery can be charged while the temperature rise of the battery is being suppressed, by employing a map, in which the allowable current value is mapped based on a battery temperature value and a battery temperature rise value. That is, the battery charger retrieves the map based on the battery temperature and the temperature rise value, obtains the allowable current value with which the battery can be charged while the temperature rise of the battery is being suppressed, and charges the battery with the allowable current value. This makes it possible to charge the nickel metal hydride battery which temperature tends to rise during charge, in a short time without causing deterioration due to temperature rise. Since the divided battery cells are alternately switched, i.e., the battery cells in one block are charged while those in the other block are being cooled, it is possible to efficiently charge the battery even just before the completion of battery charge. A battery charger obtains an allowable current value with which a battery can be charged while the temperature rise of the battery is being suppressed, by employing a map, in which the allowable current value is mapped based on a battery temperature value and a battery temperature rise value. That is, the battery charger retrieves the map based on the battery temperature and the temperature rise value, obtains the allowable current value with which the battery can be charged while the temperature rise of the battery is being suppressed, and charges the battery with the allowable current value. This makes it possible to charge a nickel metal hydride battery which temperature tends to rise during charge, in a short time without causing deterioration due to temperature rise.

Particularly, charge completion is determined based on whether or not the temperature rise value is relatively high and the frequency, with which a relatively low allowable current value is outputted from the map, is high, i.e., whether or not temperature rise is large and temperature rise is still large even with a charging current value being lowered. Due to this, it is possible to 100% charge the battery without overcharging it irrespective of the residual capacity of the battery, temperature and the like. Further, since this battery charger determines the completion of charge by dividing the battery, it is possible to accurately determine the completion of charge compared with a case of simultaneously determining it for all battery cells.

Another embodiment of a battery charger obtains an allowable current value with which a battery can be charged while the temperature rise of the battery is being suppressed, by employing a map, in which the allowable current value is mapped based on a battery temperature value and a battery temperature rise value. That is, the battery charger retrieves the map based on the battery temperature and the temperature rise value, obtains the allowable current value with which the battery can be charged while the temperature rise of the battery is being suppressed, and charges the battery with the allowable current value. This makes it possible to charge a nickel metal hydride battery which temperature tends to rise during charge, in a short time without causing deterioration due to temperature rise. Further, since all the battery cells are simultaneously charged at the beginning of battery charge in which lower heat generated and then the battery cells are charged while dividing the battery and alternately switching the charge target battery cells, i.e., the battery cells in one block are charged while those in one block are being cooled in the final charging period in which high heat is generated, it is possible to efficiently charge the battery in a short time.

Another embodiment of a battery charger obtains an allowable current value with which a battery can be charged while the temperature rise of the battery is being suppressed, by employing a map, in which the allowable current value is mapped based on a battery temperature value and a battery temperature rise value. That is, the battery charger retrieves the map based on the battery temperature and the temperature rise value, obtains the allowable current value with which the battery can be charged while the temperature rise of the battery is being suppressed, and charges the battery with the allowable current value. This makes it possible to charge a nickel metal hydride battery which temperature tends to rise during charge, in a short time without causing deterioration due to temperature rise. Further, since all the battery cells are simultaneously charged at the beginning of battery charge in which lower heat generated and then the battery cells are charged while dividing the battery cells and alternately switching the charge target battery cells, i.e., the battery cells in one block are charged while those in the other block are being cooled in the final charging period in which high heat is generated, it is possible to efficiently charge the battery in a short time.

Particularly, final charging period is determined based on whether or not the temperature rise value is relatively high and the frequency, with which a relatively low allowable current value is outputted from the map, i.e., whether or not temperature rise is large and temperature rise is still large even with a charging current value being lowered. Due to this, it is possible to appropriately judge timing for switching charge operation to division charge and to efficiently shorten charging time. Besides, charge completion is determined based on whether or not the temperature rise value is relatively high and the frequency, with which a relatively low allowable current value is outputted from the map, is high. Due to this, it is possible to 100% charge the battery cells without overcharging it irrespective of the residual capacity of the battery, battery temperature and the like. Further, since this battery charger determines the completion of charge by dividing the battery, it is possible to accurately determine the completion of charge compared with a case of simultaneously determining it for all battery cells.

A more detailed explanation of the invention is provided in the following description and appended claims take in conjunction with the accompanying drawings.

BRIEF DESCRIPTION OF THE DRAWINGS

FIG. 13 is a block diagram showing the control circuit of a battery charger in the third embodiment.

FIG. 17 is an explanatory view for the content of a map held by the control circuit in the first embodiment.

DETAILED DESCRIPTION OF THE INVENTION

Battery chargers and battery charging methods according to the preferred embodiments of the present invention will be described hereinafter with reference to the accompanying drawings.

Figure 1:
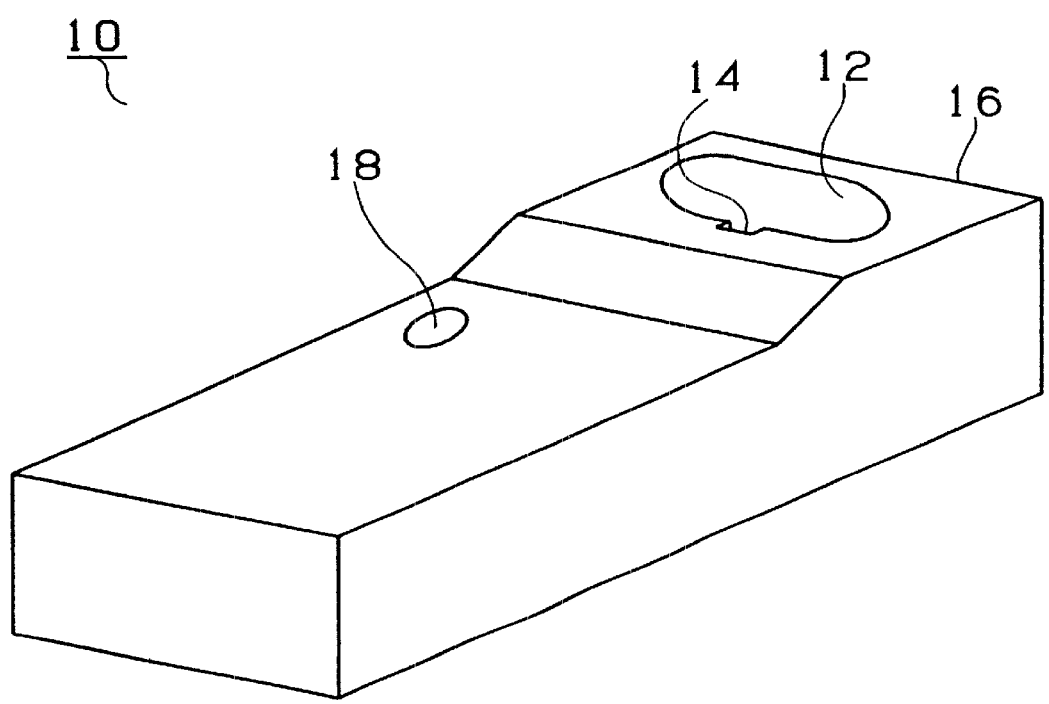
FIG. 1 is a perspective view of a battery charger in embodiments according to the present invention.
Figure 2:
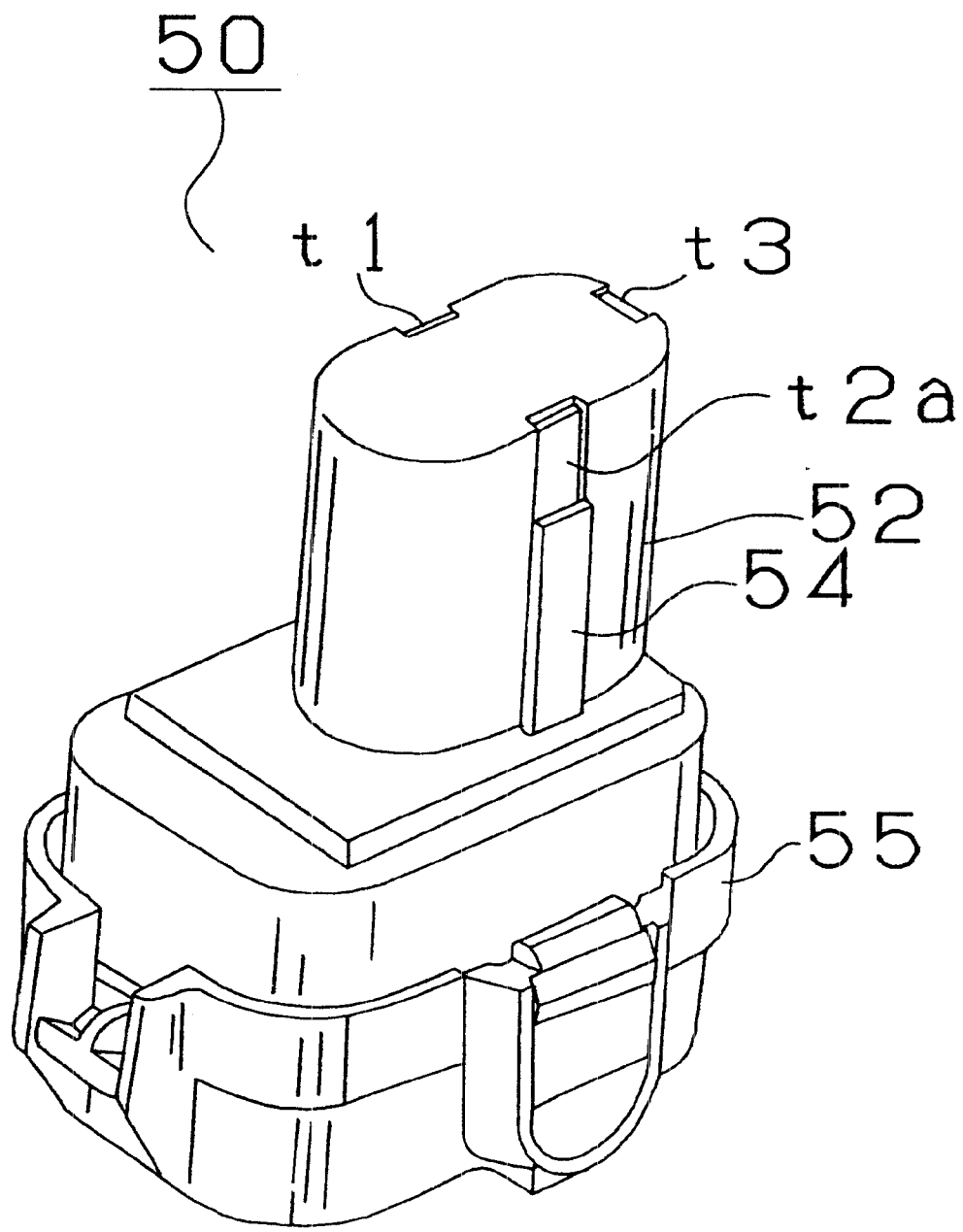
FIG. 2 is a perspective view of a battery pack in the embodiments according to the present invention.
Figure 3:
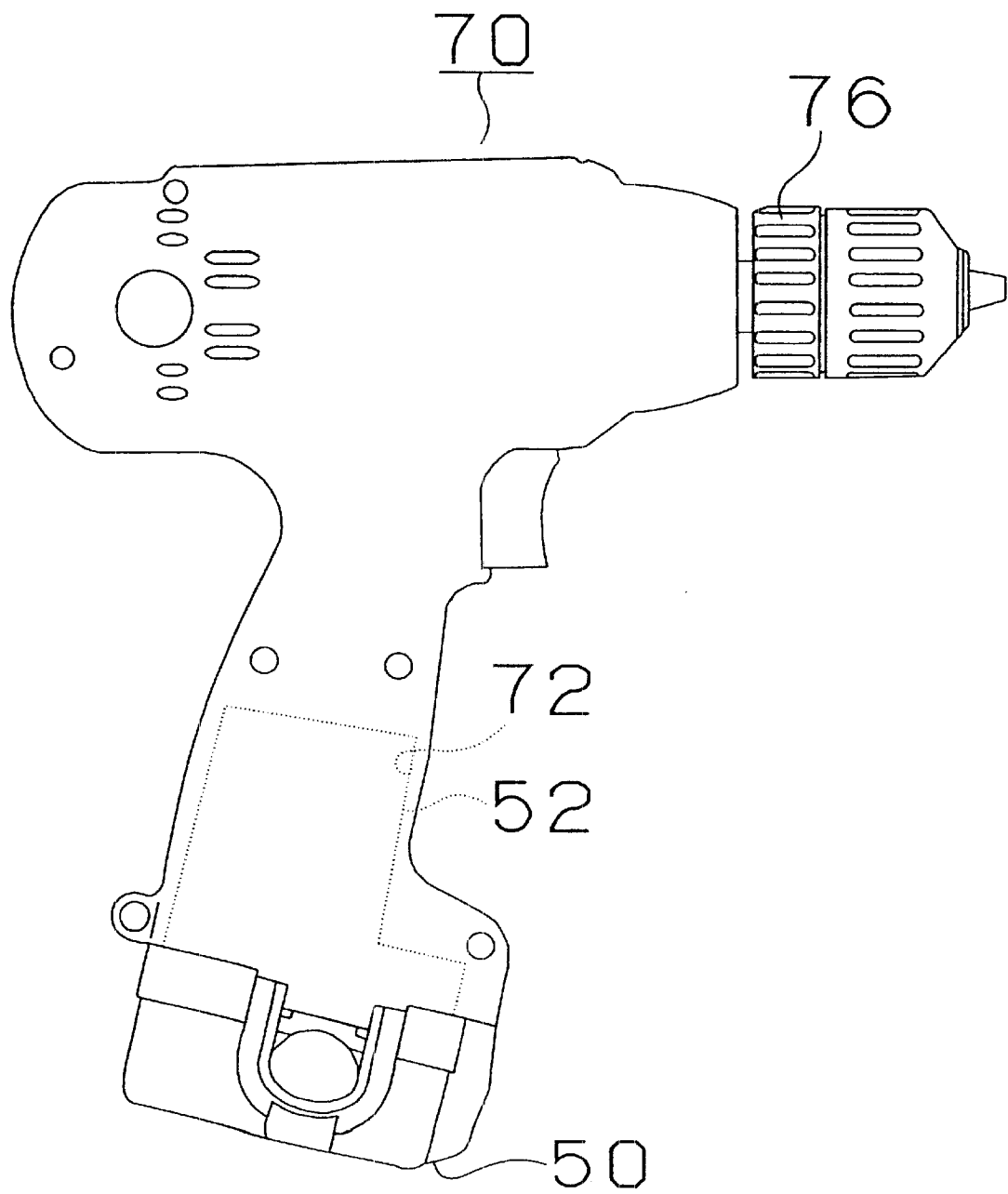
FIG. 3 is a perspective view of a battery drill employing the battery-powered pack shown in FIG. 2.

FIG. 1 shows a battery charger 10 in the first embodiment of the present invention, FIG. 2 shows a battery pack 50 charged by the battery charger 10 and FIG. 3 shows a batter-powered drill 70 driven by the battery pack 50.

As shown in FIG. 2, the battery pack 50 containing a nickel metal hydride battery cell consists of a generally cylindrical fitted part 52 and a generally prismatic base 55. A key-shaped key part 54 is formed on the side of the fitted part 52 and the first input terminal t1 connected to the positive electrode of the battery, the second input terminal t2a connected to the negative electrode thereof and the third terminal t3 connected to a temperature sensor consisting of a thermistor and these terminals are arranged on the upper portion of the fitted part 52.

As shown in FIG. 1, the battery charger 10 charging the battery packs 50 is provided with a fitting hole 12 into which the fitted part 52 of the battery pack 50 is fitted. A keyway 14 for introducing the key part 54 of the fitted part 52 is formed on the sidewall of the fitting hole 12. The fitting hole 12 is resin molded integrally with a housing 16 forming the battery charger 10. In this embodiment, the key part 54 is provided at the fitted part 52 of the battery pack 50 and the keyway 14 is provided at the fitting hole 12 of the battery charger 10, thereby preventing the battery pack 50 from being installed in a wrong direction. The first to third output terminals, which are not shown, are provided at the bottom of the fitting hole 12 to contact with the first to third terminals t1, t2a and t3 of the battery pack 50, respectively. An LED lamp 18 is provided on the upper portion of the battery charger 10 to indicate that the battery is being charged.

As shown in FIG. 3, the battery-powered drill 70 is provided with a fitting hole 72 into which the fitted part 52 of the battery pack 50 is fitted, and is constructed to rotate a chuck 76 by a motor, which is not shown, when supplied with power from the first input terminal t1 and the second input terminal t2a of the battery pack 50. When the battery-powered drill 70 is used, a plurality of batteries in the battery pack 50 that are completey charged are sequentially used so that the battery-powered drill 70 can continuously operate. To this end, the battery charger in this embodiment is designed so as to be capable of quickly charging the battery pack 50 in about 30 minutes.

Figure 4:
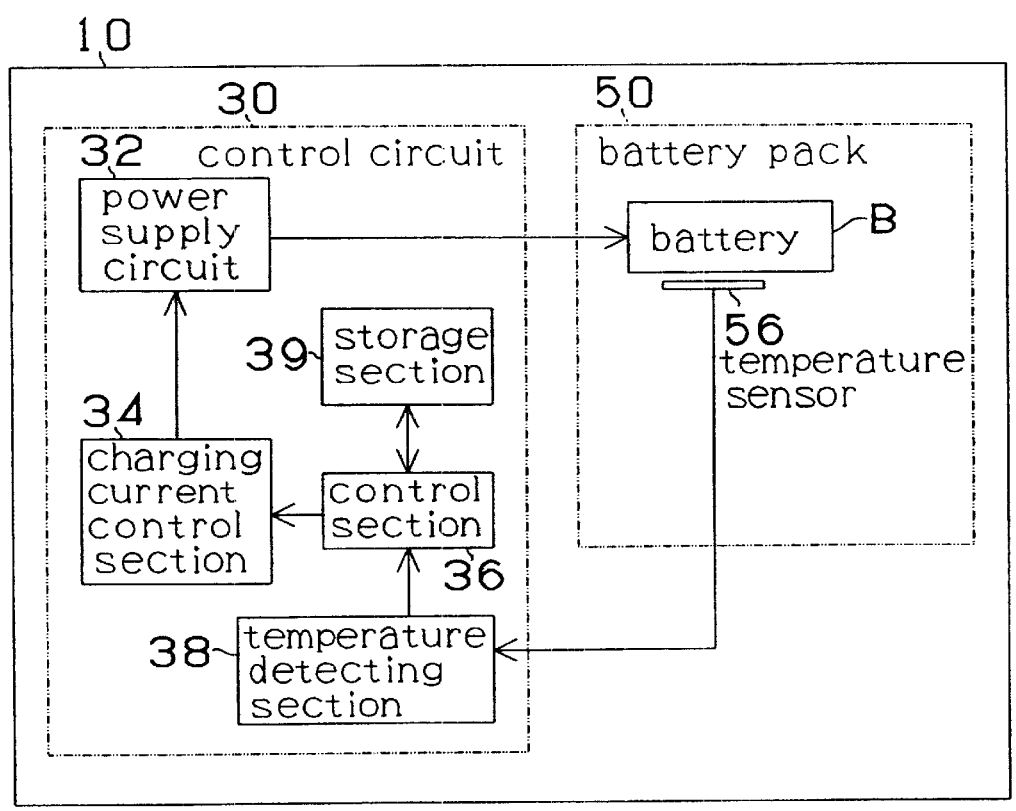
FIG. 4 is a block diagram showing a control circuit in the battery charger shown in FIG. 1.

FIG. 4 shows the configuration of a control circuit 30 in the battery charger 10. The control circuit 30 consists of a temperature detecting section 38 detecting a battery temperature from an output value from a temperature sensor (thermistor) 56 provided at the battery pack 50 side, a storage section 39 storing current value control information to be described later, a control section 36 differentiating the temperature value outputted from the temperature detecting section 38, obtaining a temperature rise value, obtaining a current value with which a battery is chargeable while suppressing the temperature rise value and outputting the current value as a current command value to a charging current control section 34, and the charging current control section 34 controlling a power supply circuit 32 based on the current command value from the control section 36 and adjusting battery charging current.

Next, the operation principle of the battery charger in the first embodiment will be described.

If charging current for a battery increases, charging time becomes shorter but temperature rise becomes larger. Conversely, if charging current decreases, charging time becomes longer but temperature rise becomes smaller. A nickel metal hydride battery, in particular, has characteristics that a temperature gradient (temperature rise value) varies greatly with charging current and the already charged capacity. Due to this, in this embodiment, battery charge is conducted while changing the current value so as to avoid overheating the battery. In other words, the conventional battery charger charges a battery with a fixed current value, whereas the battery charger in this embodiment determines the state of a battery based on a temperature rise value and charges the battery while changing the current value with which the temperature rise of the battery is made fixed, that is, while changing the current value according to the temperature rise of the battery.

In this embodiment, if battery temperature is high, relatively low charging current is applied to the battery. If the battery temperature is low, relatively high charging current is applied thereto.

Figure 5:
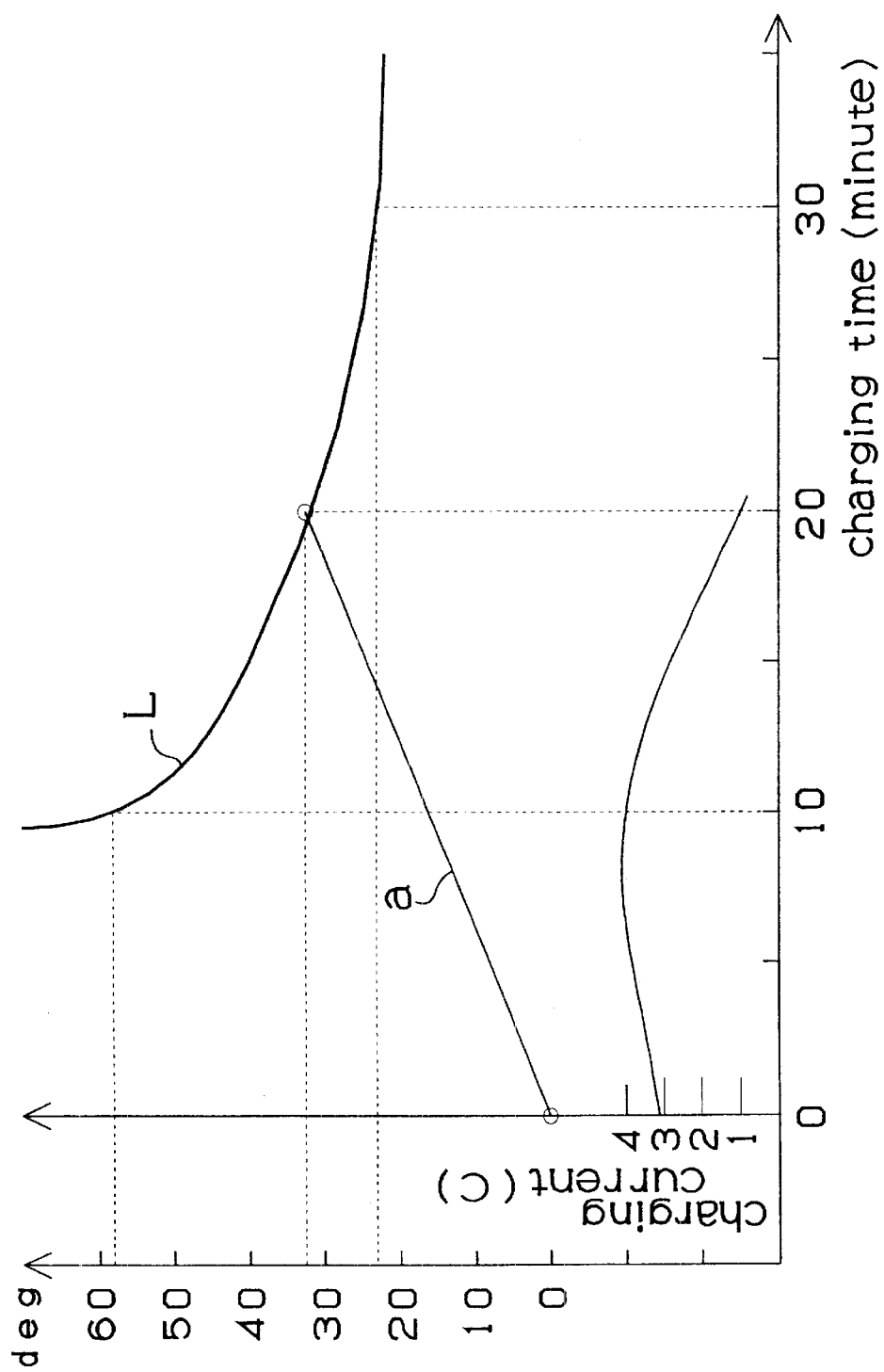
FIG. 5 is an explanatory view for the charge principle of a battery charger in the first embodiment according to the present invention.

The operation principle of the battery charger in the first embodiment will be described in more detail with reference to FIG. 5. In FIG. 5, the vertical axis indicates battery temperature rise values and the horizontal axis indicates charging time. A curve L therein shows temperature rise values at the time of the completion of battery charge corresponding to the charging time while the battery is charged so that the temperature rise value may be constant. The curve L indicates, for instance, that if current is controlled so that the battery temperature which starts at 20° C. may reach 53° C. (a temperature rise value of 33 degrees), charging time is 20 minutes, if current is controlled so that the battery temperature may reach 43° C. (a temperature rise value of 23 degrees), charging time is 30 minutes and that if current is controlled so that the battery temperature may reach 78° C. (a temperature rise value of 58 degrees), charging time is 10 minutes.

That is, it is possible to obtain a temperature rise value (gradient) from the charge completion time and the battery temperature rise value at the time of the completion of battery charge based on the curve L. For example, to complete battery charge in 20 minutes, battery charge may be conducted so as to have a temperature gradient (temperature rise value) indicated by a straight line a which connects 0 deg. in FIG. 5 and 33 deg. on the curve L. In this case, battery charge is completed almost exactly in 20 minutes when the battery temperature becomes 53° C. (a temperature rise value becomes 33 deg.).

The same thing is true for a case where battery charge is completed in 20 minutes at an outside air temperature of 10° C. and a battery temperature of 10° C. Namely, the battery may be charged so as to have a temperature gradient (temperature rise value) indicated by the solid line a which connects 0 deg. in FIG. 5 and 33 deg. on the curve L. In this case, battery charge is completed at a temperature of 43° C. (a temperature rise value of 33 deg.).

Likewise, in case of completing battery charge in 20 minutes at an outside temperature of 30° C. and a battery temperature of 30° C., the battery may be charged so as to have a temperature gradient (temperature rise value) indicated by the solid line a which connects 0deg. in FIG. 5 and 33 deg. on the curve L. In this case, battery charge is completed at a temperature of 63° C. (a temperature rise value of 33 deg.).

Now, the change of the current value while the above-stated temperature rise value is made constant will be described with reference to FIGS. 6 and 7.

Figure 6:
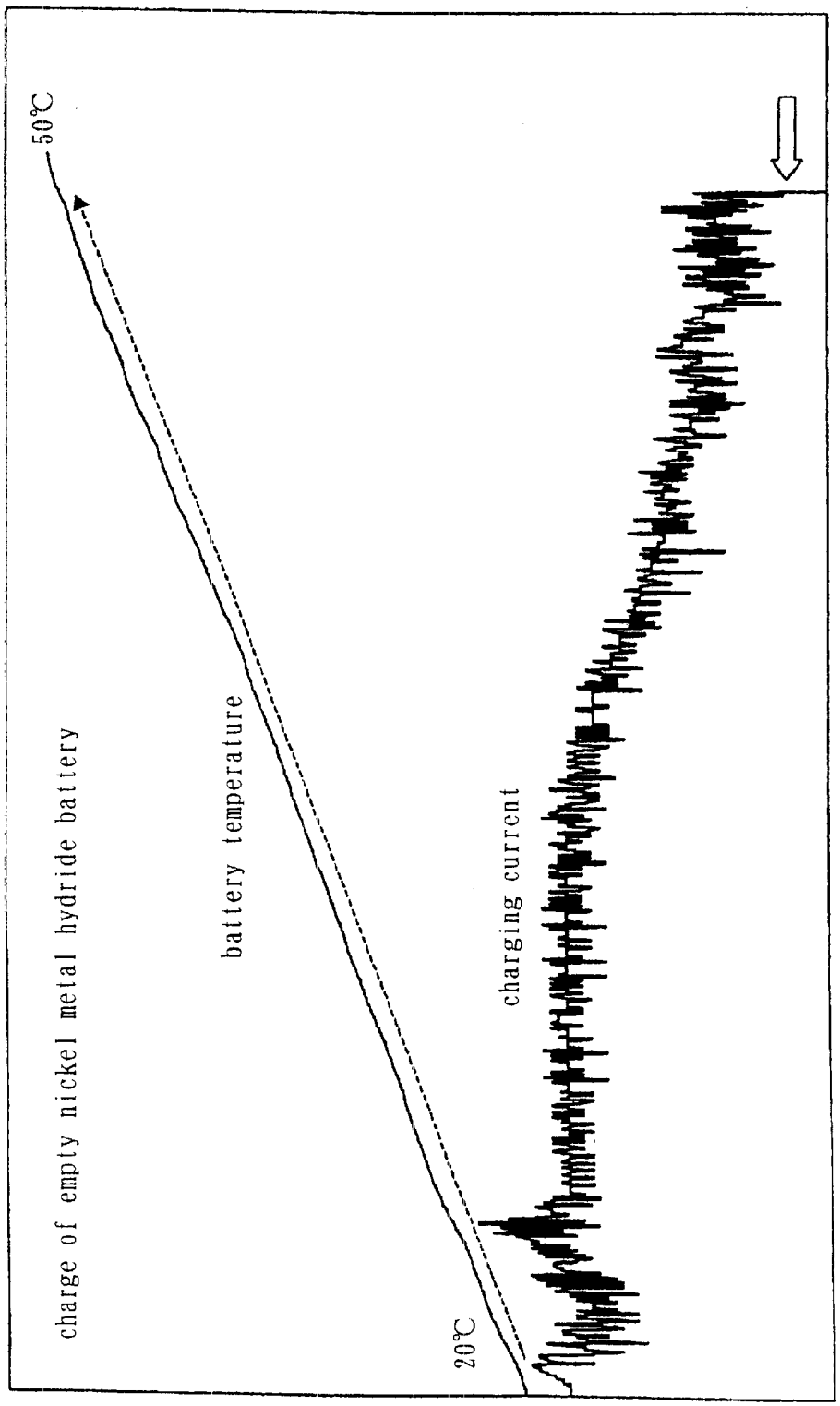
FIG. 6 is a graph showing the changes of charging current and battery temperature controlled by the battery charger.

FIG. 6 shows a simulation result when charging a nickel metal hydride battery in 25 minutes so that the battery temperature of 20° C. becomes 50° C. To make a temperature rise value constant, it is necessary to frequently adjust a charging current value. FIG. 6 indicates that the current value is relatively high in the first half of battery charge and gradually lower in the second half of battery charge. Here, the charging current is greatly decreased at a temperature of about 50° C., which indicates that the nickel metal hydride battery is completed with charge. In this embodiment, if this phenomenon is detected, battery charge is completed.

Figure 7:
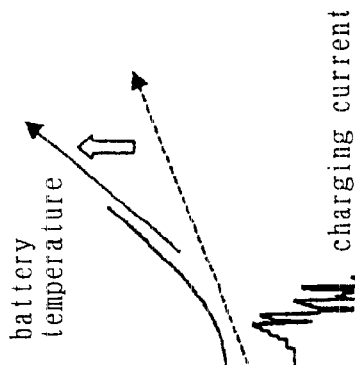
FIG. 7 is a graph showing the changes of charging current and battery temperature controlled by the battery charger.

FIG. 7 shows a simulation result for another nickel metal hydride battery. When the nickel metal hydride battery is fully charged, a phenomenon known as "overshoot" in which battery temperature suddenly rises due to the past charging record, not due to the present charging current, may occur to the nickel metal hydride battery. When the overshoot occurs, the temperature rise value cannot be made less than a constant value even if the current value is lowered. In this embodiment, battery charge can be completed even if this phenomenon is detected.

Figure 8:
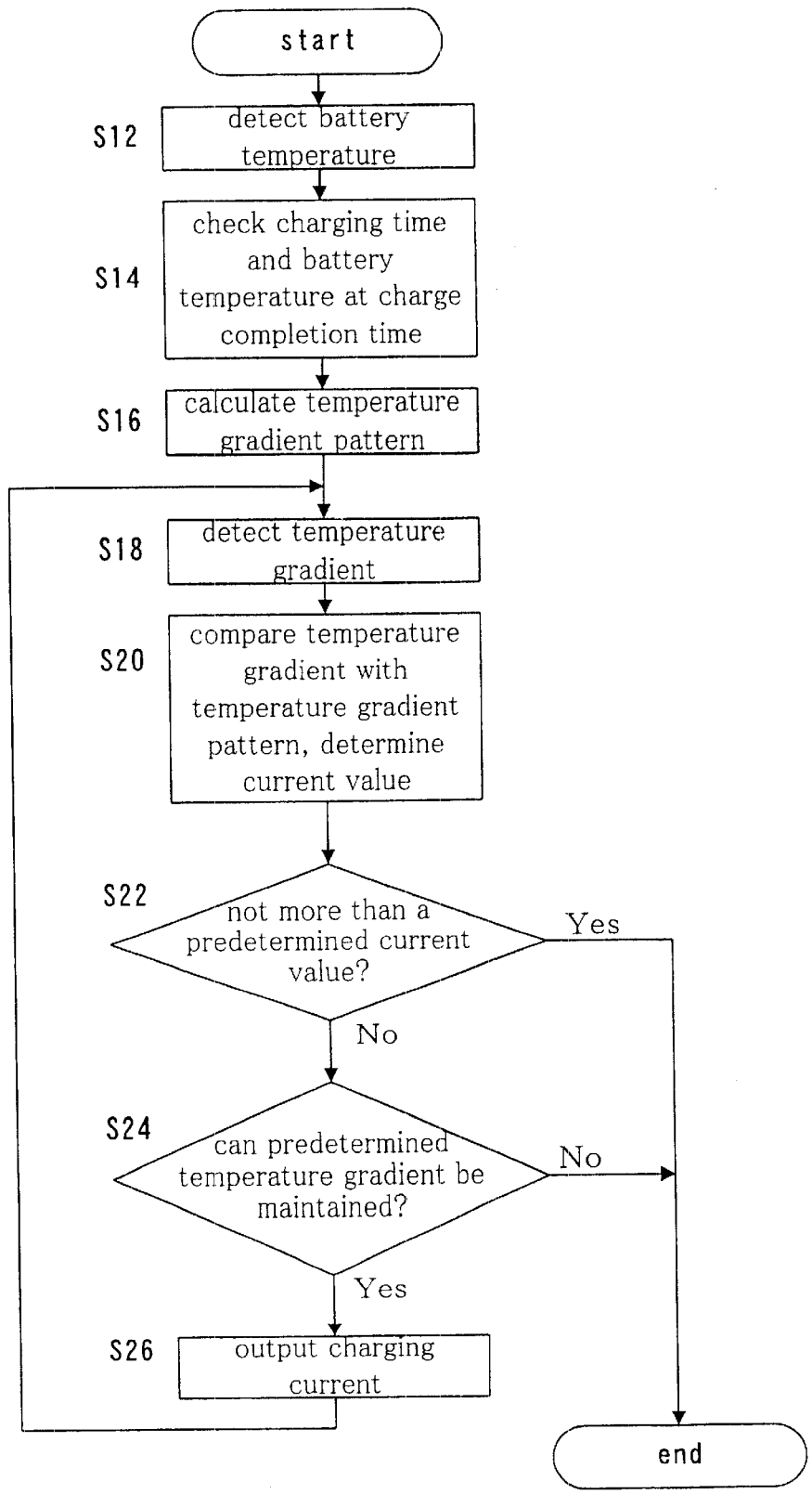
FIG. 8 is a flow chart showing processing in the control section of the battery charger in the first embodiment.

Next, battery charge conducted by the battery charger in the first embodiment will be described with reference to the flow chart of FIG. 8 showing the processing.

First, the control section 36 detects the temperature of the battery pack 50 through the temperature detecting section 38 (in S12). Here, it is assumed that an outside air temperature and a battery temperature is 20° C. Next, charging time and charge completion time are checked (in S14). The battery charger in this embodiment is constituted to switch battery charge between quick charge (20-minute charge) and normal charge (30-minute charge). If battery charge is set at the quick charge, the storage section 39 which holds the values of the curve L described above with reference to FIG. 5 is retrieved to thereby obtain a battery temperature of 53° C. at the time of charge completion. Thereafter, a temperature gradient is calculated (in S16). Here, the gradient of the straight line a connecting 0 deg. and 33 deg. on the curve L shown in FIG. 5 is obtained.

The control section 36 differentiates the difference between the temperature value inputted from the previous temperature detecting section and the temperature value inputted this time and obtains a temperature rise value (in S18). The control section 36 then compares this detected temperature rise value with the gradient calculated in the step 16 and thereby determines a current value (in S20). Here, if the temperature rise value is lower than the gradient, the current value is increased from the present value. If lower, the current value is decreased.

Next, it is determined whether the current value is less than a predetermined value (in S22). As described above with reference to FIG. 6, if battery charge is completed and the current value becomes less than the predetermined value ("Yes" in S22), charge processing is ended. If the current value is more than the predetermined value ("No" in S22), it is further determined whether a predetermined temperature gradient can be maintained by adjusting the current value, i.e., whether overshoot stated above with reference to FIG. 7 has occurred (in S24). If overshoot has occurred ("No" in S24), the processing is ended. If overshoot has not occurred ("Yes" in S24), the processing goes to a step 26, whereafter the battery is charged with the current value determined in the step 20 and the charge processing is continued further.

The battery charger in the first embodiment advantageously facilitates charge processing since the temperature rise value is made constant. Furthermore, the battery charger charges the battery while adjusting the current value so that the temperature rise value becomes the calculated temperature rise gradient. Thus, it is possible to charge the battery so that the temperature at the time of the completion of charge may become a target temperature value which the battery is intended to reach and to charge a nickel metal hydride battery or the like in a short time without overheating the battery.

In this embodiment, the curve L shown in FIG. 5 is stored in the battery charger. It is also possible to store only the highest charge temperature (e.g., 30 deg.) in a range in which the life of the nickel metal hydride battery is not shortened and charging time (e.g., 25 minutes) corresponding to a temperature rise value of 30 deg., to thereby control battery charge to be completed with the temperature rise value of 30 deg. It is also possible to further simplify the structure of the battery charger, to keep the temperature gradient of the battery constant and to charge the battery with this temperature gradient.

Next, a battery charger in the second embodiment according to the present invention will be described with reference to FIGS. 9 to 12. The battery charger in the first embodiment stated above adjusts a current value so as to make a temperature rise value constant. The battery charger in the second embodiment, by contrast, adjusts a current value so that battery temperature increases along a predetermined pattern.

Figure 9:
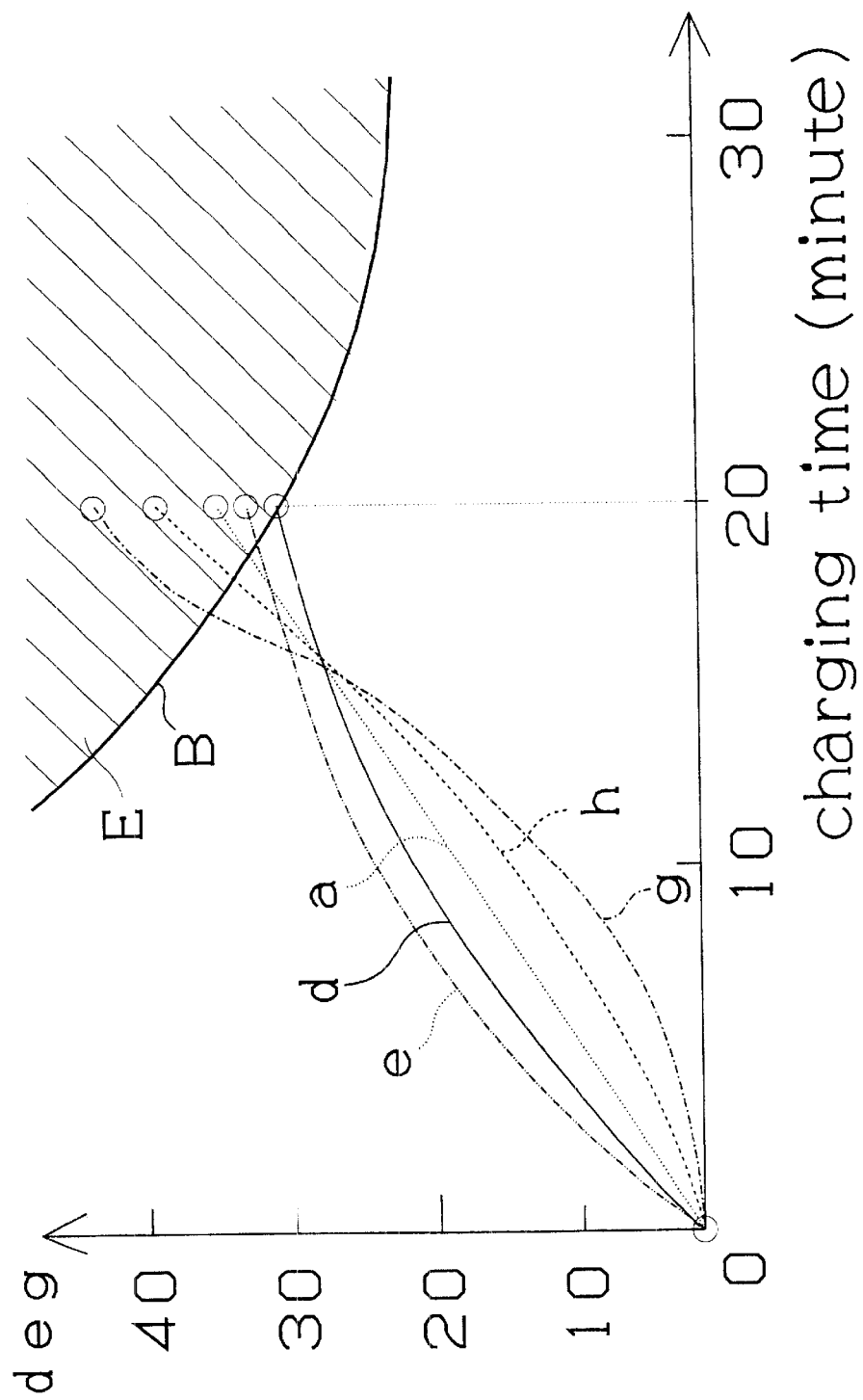
FIG. 9 is an explanatory view for the charge principle of a battery charger in the second embodiment.

The principle of this battery charge will be described with reference to FIG. 9. In FIG. 9, the vertical axis indicates temperature rise values and the horizontal axis indicates charging time. A hatched area E indicates a temperature rise value and charging time at the time of the completion of charge. If, for example, a temperature gradient indicated by symbol a is made constant to complete battery charge in 20 minutes as done by the battery charger in the first embodiment, the temperature of the battery becomes 33 deg. at the time of the completion of battery charge. On the other hand, if the battery is charged so that the temperature rise value is along an upwardly rounded pattern as indicated by a solid line d in FIG. 9, the battery charge can be completed with a temperature rise value of 30 deg. Also, if the battery is charged so that a temperature rise value is along a more upwardly rounded pattern than the solid line d, the battery charge can be completed at a temperature rise value of 32 deg. Conversely, if the battery is charged along a trough pattern as indicated by a broken line h, the battery charge is completed at a temperature rise value of 38 deg. If the battery is charged so that a temperature rise value does not conform with a specific pattern as indicated by a dashed line g, the battery temperature rise value increases nearly 43 deg.

That is to say, the hatched area E indicates temperature rise values and charge time at the completion of battery charge when the battery is charged under various conditions. The border line B of the area E indicates the final temperature rise value when the battery charge is completed at the lowest temperature. If the temperature rise value is made constant in the case of the first embodiment, the broken line a shown in FIG. 9 shows that the temperature rise value is 33 deg. If the temperature rise value is along the slightly upwardly rounded temperature rise pattern indicated by the solid line d, the battery can be charged at the lowest temperature rise value (30 deg.). The reason the battery can be charged at lower temperature when the temperature rise value is along the upward round pattern, than when the temperature rise value is made constant, is considered as follows. The temperature rise pattern is generated based upon factors such as whether the difference between the battery temperature and the ambient temperature is small, the battery is difficult to cool, the capacity is nearly empty, temperature rise during battery charge is relatively small and the temperature rise value is relatively high in the first half of the battery charge. Conversely the temperature rise pattern may be generated based upon factors such as whether the difference between the battery temperature and the ambient temperature is large, the battery is easily cooled, temperature rise during battery charge is relatively large and the temperature rise value is relatively low in the second half of the battery charge. That is, by setting the temperature rise pattern so as to optimize the various charging conditions, it is possible to charge the battery so that the battery temperature at the time of the completion of charge may be minimized. In this embodiment, the battery charge is conducted while adjusting the current value in accordance with the temperature rise pattern with which battery charge can be completed at the lowest temperature based on the above experiment.

Figure 10:
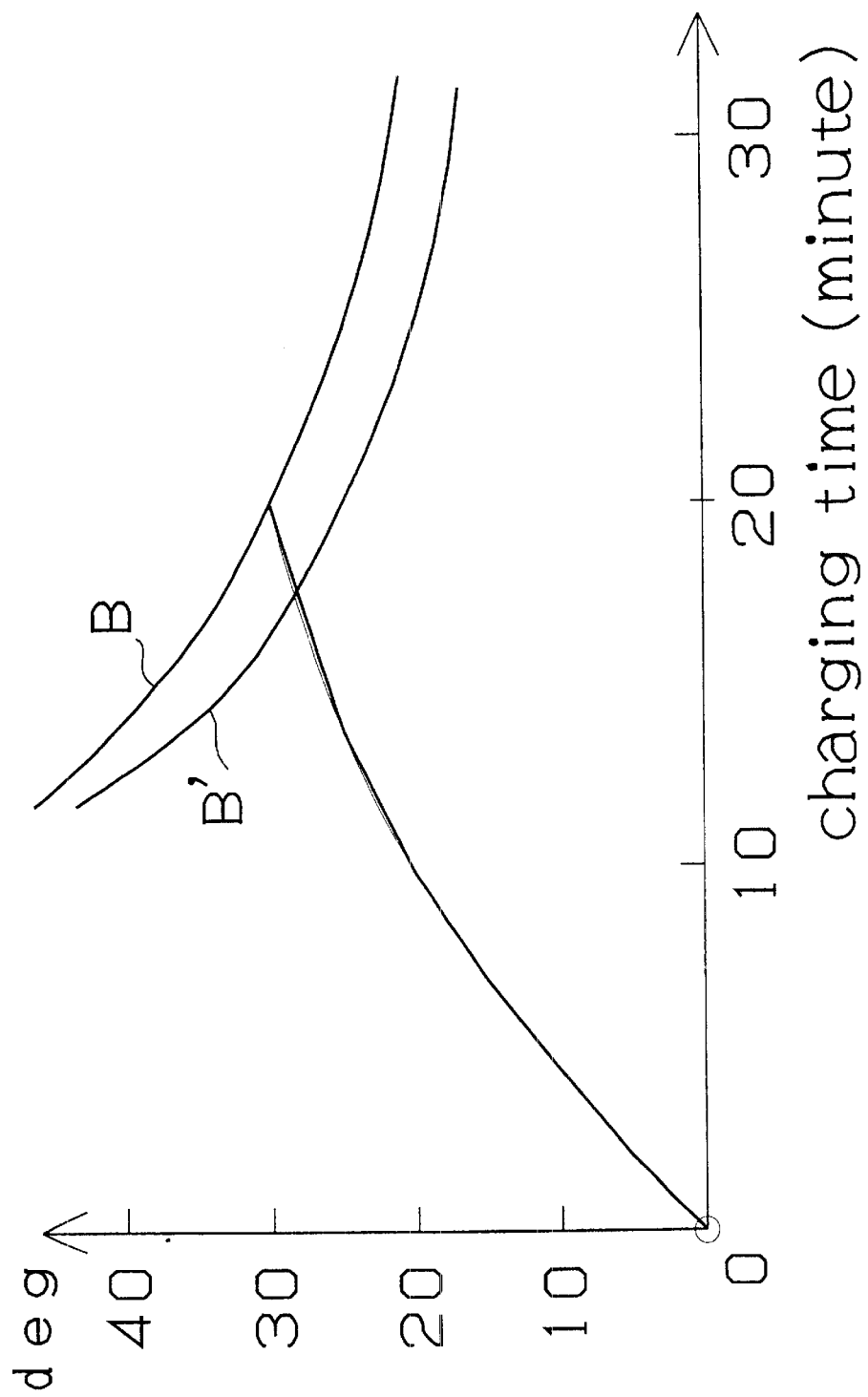
FIG. 10 is an explanatory view for the control principle of the battery charger in the second embodiment.

FIG. 10 shows the change of the border line B in accordance with the battery temperature. In FIG. 10, the border line B indicates that outside air temperature (20° C.) is equal to the battery temperature. A border line B' indicates that the battery temperature (20° C.) is higher than the outside air temperature (15° C.). In this case, the border line B' is shifted downward from the border line B by 5° C.

Figure 11:
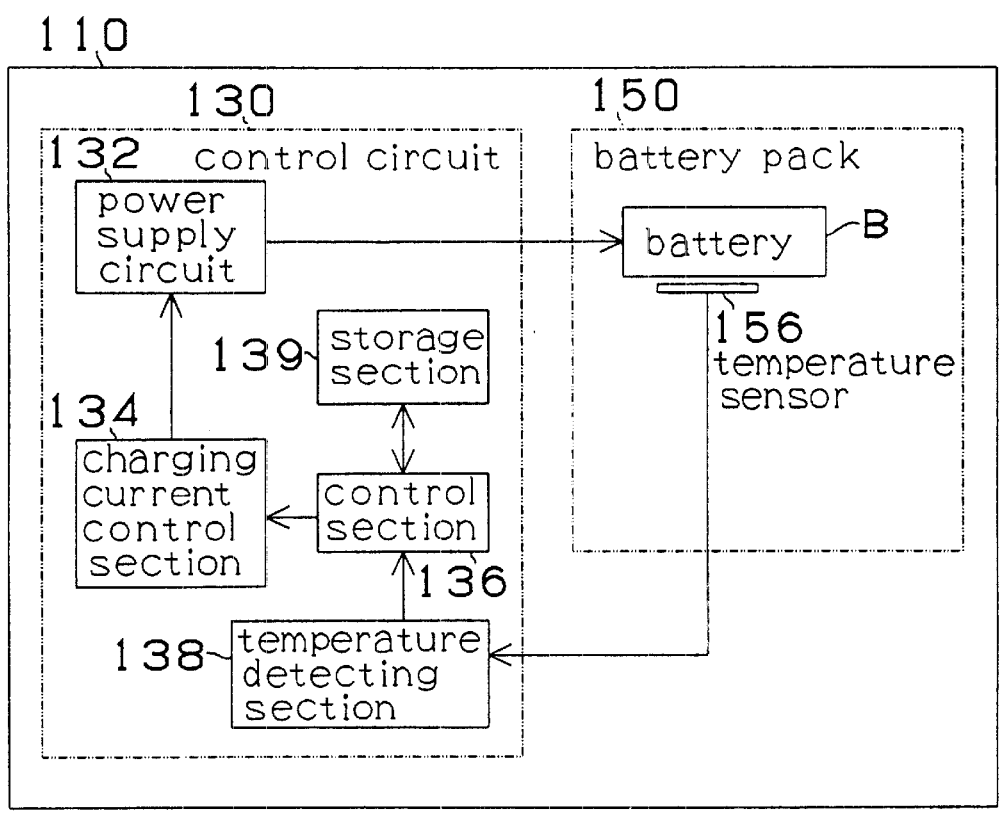
FIG. 11 is a block diagram showing the control circuit of the battery charger in the second embodiment.

FIG. 11 shows the configuration of a control circuit 130 in a battery charger 110 in the second embodiment. The control circuit 130 is the same as that in the first embodiment stated above with reference to FIG. 4. However, unlike the first embodiment, the storage section 139 of the control circuit 130 in the second embodiment holds a temperature rise pattern stated above with reference to FIG. 9. This temperature rise pattern which is approximated polygonally in a certain time in which the temperature rises 5 deg., is stored in the storage section. For example, in case of the temperature rise pattern indicated by the solid line d stated above with reference to FIG. 9, the battery temperature pattern rises 5 deg. in two minutes, 10 deg. in four minutes, 15 deg. in six minutes, 20 deg. in nine minutes, 25 deg. in 13 minutes and 30 deg. in 20 minutes, that is, the pattern is held in the data format of (2, 4, 6, 9, 13, 20), whereby the capacity of the storage section is intended to be reduced and the arithmetic processing of the control section 136 is intended to be simplified. At the time of temperature control, the charging current is adjusted so as to follow a gradient approximated for every 5 deg. as shown in FIG. 10.

In case of charging the battery at a temperature of, for example, 20° C. at an outside air temperature of 15° C., the battery charger 110 calculates a pattern in which a temperature rise value at the time of the completion of charge is decreased by 5° C. is calculated as stated above with reference to FIG. 10 and charges the battery in accordance with this pattern. Conversely, if the outside air temperature is 25° C. and the battery temperature is 20° C., the battery charger 110 calculates a pattern in which a temperature rise value at the time of the completion of charge is increased by 5° C.

Figure 12:
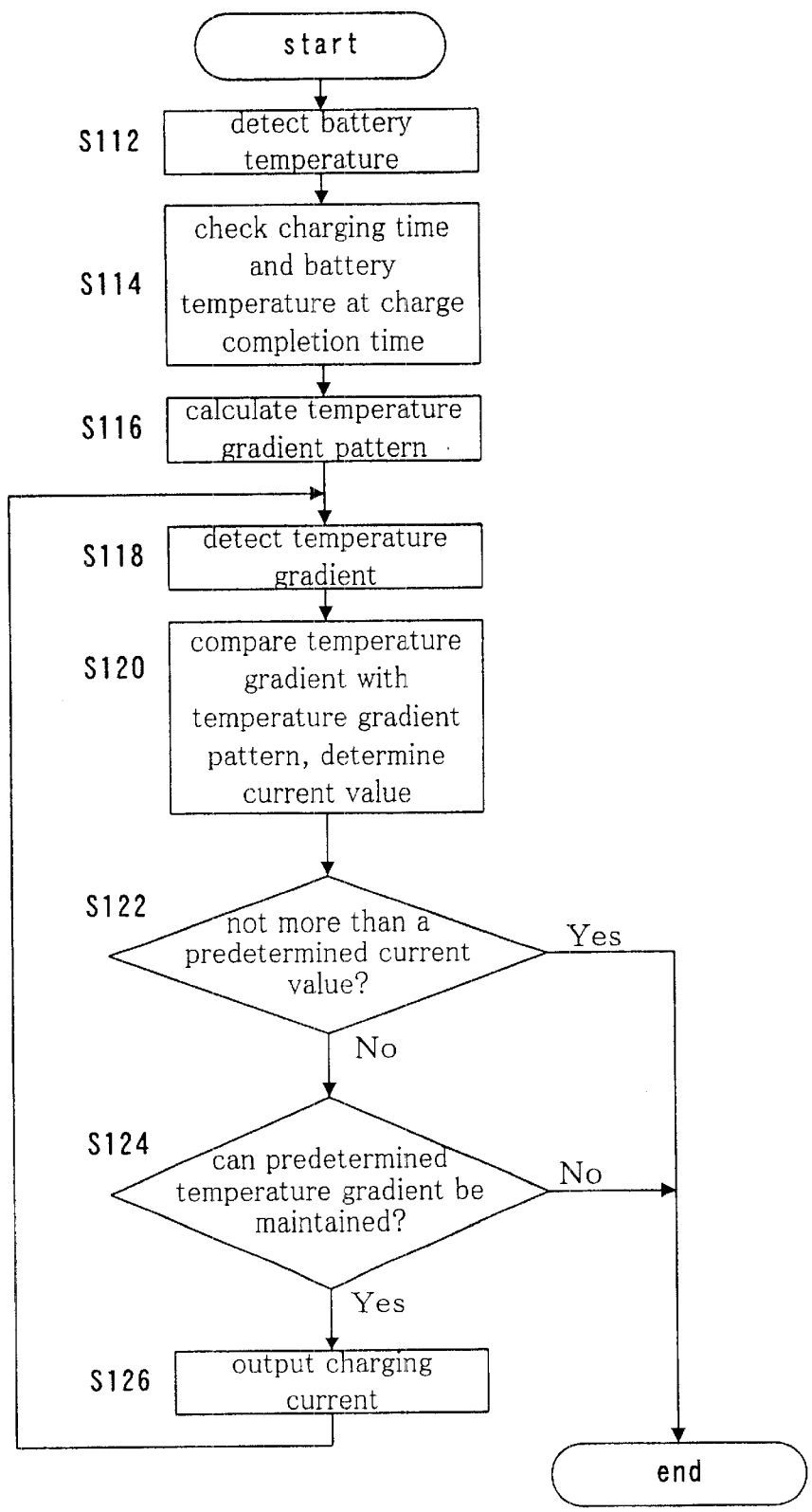
FIG. 12 is a flow chart showing processing in the control section of the battery charger in the second embodiment.

The specific charge control of the battery charger in the second embodiment will be described with reference to FIG. 12.

First, the control section 136 detects the temperature of the battery pack 150 from the temperature detecting section 138 (in S112). Here, it is assumed that outside air temperature is 20° C. and battery temperature is 25° C. Next, charging time and battery temperature at the time of the completion of charge are checked (in S114). In this case, when charging time is 20 minutes, the final temperature rise value of 35 degrees (30 deg. +5 deg.) is obtained. Thereafter, a temperature rise pattern is calculated (in S116).

The control section 136 differentiates the difference between the temperature value inputted from the previous temperature detecting section and the temperature value inputted this time and obtains a temperature rise value (in S118). The control section 136 then compares this detected temperature rise value with the temperature rise pattern calculated in the step 116 and thereby determines a current value (in S120). Here, if the temperature rise value is lower than the temperature gradient, the current value is increased from the present value. Conversely, if lower, the current value is decreased.

Next, it is determined whether the current value is less than a predetermined value (in S122). As in the case of the first embodiment, if battery charge is completed and the current value becomes less than the predetermined value ("Yes" in S122), charge processing is ended. On the other hand, if the current value is more than the predetermined value ("No" in S122), it is further determined whether a predetermined temperature gradient can be maintained by adjusting the current value, i.e., whether overshoot has occurred (in S124). If overshoot has occurred ("No" in S124), the processing is ended. If overshoot has not occurred ("Yes" in S124), the processing goes to a step 126, whereafter the battery is charged with the current value determined in the step 120 and the charge processing is continued.

The battery charger in the second embodiment charges a battery while adjusting the current value so that the temperature rise value becomes a temperature rise pattern. Due to this, as stated above with reference to FIG. 9, by optimizing the temperature rise pattern, it is possible to charge the battery so that the battery temperature at the time of the completion of charge may become a target temperature value which the battery is intended to reach (the lowest temperature).

The battery charger in this embodiment sets the temperature rise pattern to be upwardly rounded, i.e., sets the temperature rise pattern such that the difference between the battery temperature and the ambient temperature is small, the battery is difficult to cool, the capacity is nearly empty, the temperature rise during battery charger is relatively small and the temperature rise value in the first half of the battery charge is relatively high. Conversely, the temperature rise pattern may be generated based upon factors such as whether the difference between the battery temperature and the ambient temperature is large, the battery is easily cooled, temperature rise during battery charge is relatively large and the temperature rise value in the second half of battery charge is relatively low. That is, by setting the temperature rise pattern so as to optimize the various charging conditions, it is possible to charge the battery so that the battery temperature at the time of the completion of charge may be the minimized.

Figure 14:
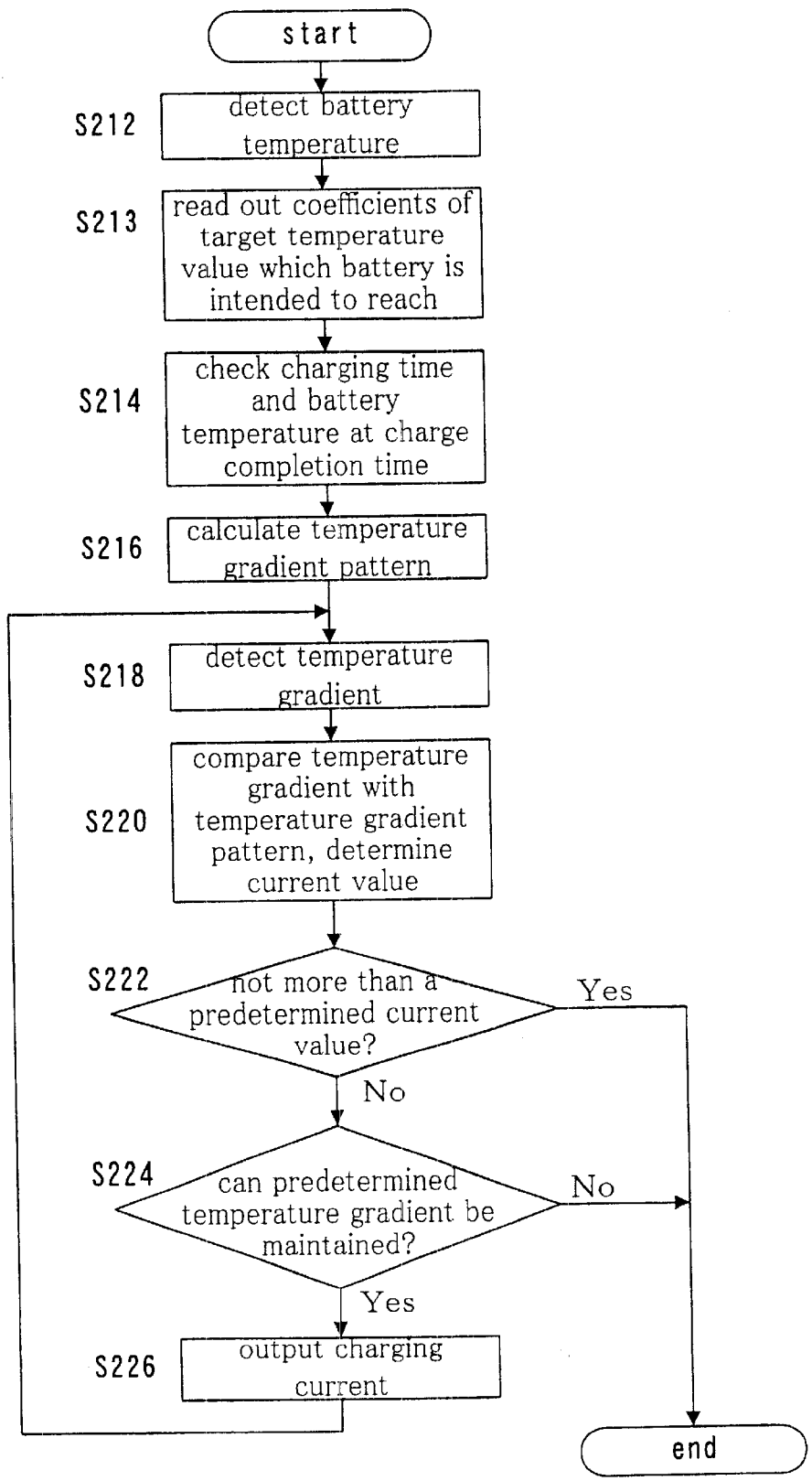
FIG. 14 is a flow chart showing processing in the control section of the battery charger in the third embodiment.
Figure 15:
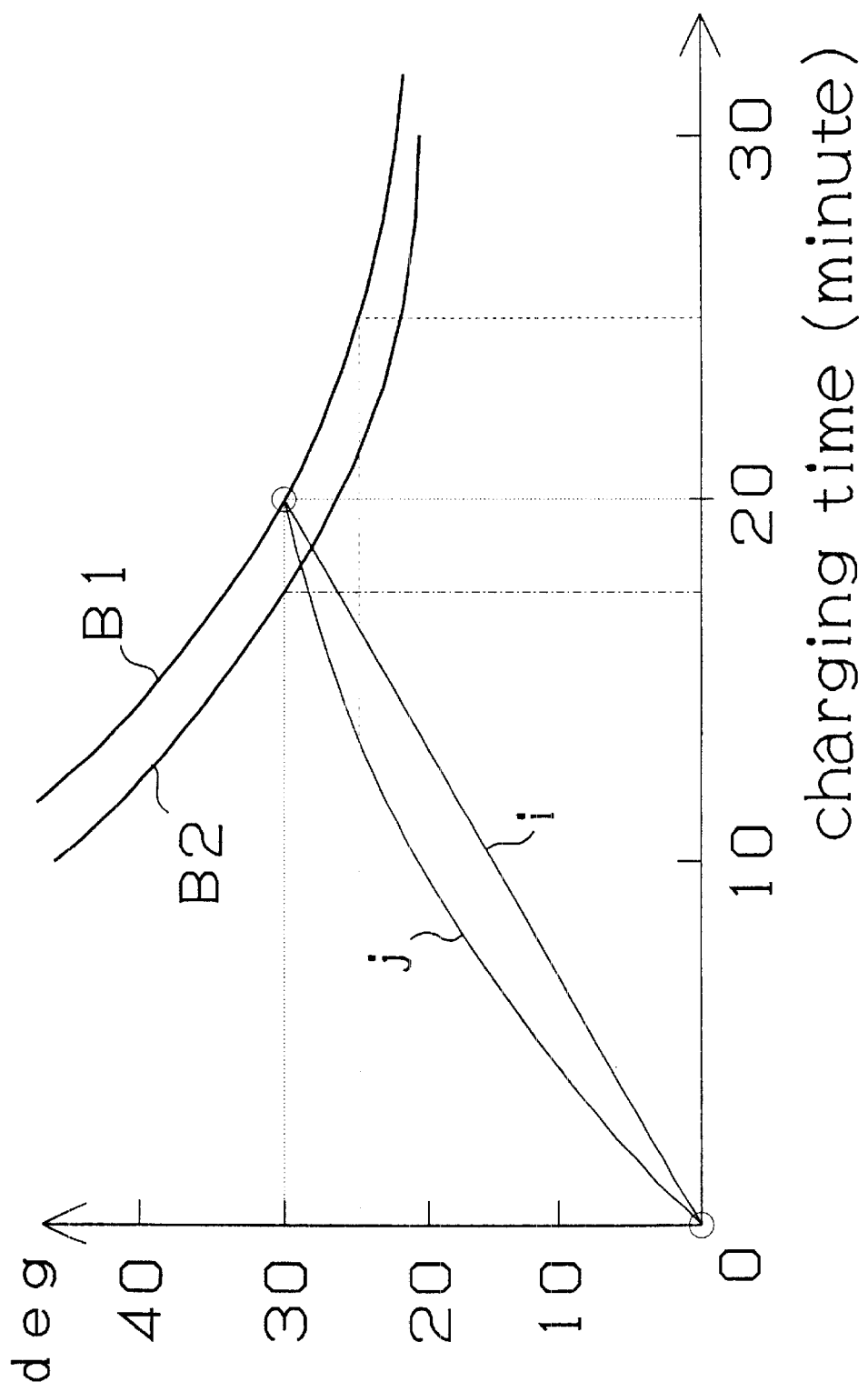
FIG. 15 is an explanatory view showing the control principle of a battery charging method in the third embodiment.

Next, a battery charging method in the third embodiment according to the present invention will be described with reference to FIGS. 13 to 15.

In the second embodiment stated above, the battery charger stores the charging time and final battery temperature rise values shown in FIG. 10. In the third embodiment, by contrast, a battery pack stores border lines each indicating the final temperature when battery charge is completed at the lowest temperature described above with reference to FIG. 9. Namely, the final temperature which the battery reaches when it is completely charged differs depending on the voltage of the battery pack (the number of battery cells), the type of the battery (nickel metal hydride batteries may have different characteristics), the heat radiation characteristics of the battery pack and the like. Due to this, the battery charger in this embodiment is intended to be capable of charging any battery pack most efficiently by storing the border values in the battery pack (to be referred to as a target temperature values which the battery is intended to reach).

The configurations of a battery charger 210 and battery packs 250A and 250B for the battery charging method in the third embodiment will be described with reference to FIG. 13. The battery pack 250A is provided with a ROM 258a which stores a target temperature value (B1 in FIG. 15) which the battery pack 250A is intended to reach. The battery pack 250B is provided with a ROM 258b which stores a target temperature value (B2 in FIG. 15) which the battery pack 250B is intended to reach. It is noted that the target temperature values B1 and B2 are expressed by a formula of $Y=\beta/(X+\alpha)+\gamma$ and that the values of coefficients $\alpha$, $\beta$ and $\gamma$ are written in the ROM 258a and ROM 258b, respectively.

Meanwhile, a control circuit 230 in the battery charger 210 is provided with a ROM reader 231 for reading out the contents of the above-stated ROMs 258a and 258b. A storage section 239 contains an equation for generating a temperature rise pattern. The remaining constituent elements are the same as those in the first embodiment described above with reference to FIG. 4. No description thereto will be, therefore, given herein.

The specific charge control of the charging method in the third embodiment will be described with reference to FIG. 14.

First, the control section 236 of the battery charger 210 detects the temperature of the battery pack 250A from a temperature detecting section 238 (in S212). Here, it is assumed that the battery temperature is 20° C. Next, the coefficients $\alpha$, $\beta$ and $\gamma$ for generating the target temperature value B1 are read out from the ROM 258a of the battery pack 250A and a curve of the target temperature value B1 shown in FIG. 15 is calculated (in S213). Then, charging time and battery temperature at the time of the completion of battery charge are checked (in S214). Here, the battery charger 210 is constructed to permit the operator to switch battery charge between quick charge and normal charge. In quick charge, a battery temperature rise value of up to 30 deg. is allowed. In normal charge, the battery charge is to be completed with a temperature rise of not more than 25 deg. If normal charge is selected, charging time of 25 minutes is confirmed from the temperature rise value of 25 deg. at the time of the completion of charge. On the other hand, if quick charge is set, charge time of 20 minutes is confirmed.

Thereafter, a temperature gradient pattern is calculated (in S216). If it is confirmed that charge time is 20 minutes in quick charge, an upwardly rounded curve (temperature rise pattern) j is calculated based on the equation in the storage section 239 from a segment i connecting 0 deg. and 30 deg. in FIG. 15. In the third embodiment, the temperature rise pattern is calculated based on the equation. It is also possible to store a plurality of patterns instead of the equation and to relate the patterns to thereby obtain a pattern.

The control section 236 obtains a temperature rise value from the difference between the temperature value inputted from the previous temperature detecting section and the temperature value inputted this time (in S218), this detected temperature rise value is compared with the gradient calculated in the step 216 and thereby determines a current value (in S220). Here, if the temperature rise value is lower than the temperature rise pattern, the current value is increased from the present value. If lower, the current value is decreased.

Next, it is determined whether the current value is less than a predetermined value (in S222). As in the case of the first embodiment, if battery charge is completed and the current value becomes less than the predetermined value ("Yes" in S222), charge processing is ended. On the other hand, if the current is more than the predetermined value ("No" in S222), it is further determined whether the temperature gradient can be maintained by adjusting the current value, i.e., whether overshoot has occurred (in S224). If overshoot has occurred ("No" in S224), processing is ended. If overshoot has not occurred ("Yes" in S224), processing goes to a step 226, whereby the battery is charged with the current value determined in the step 220 and charge processing is continued further.

In the battery charging method in the third embodiment, the battery packs 250A and 250B store the target temperature values B1 and B2, respectively. Due to this, it is possible to complete charging the battery pack 250A in the shortest time of 20 minutes and charging the battery pack 250B having the target temperature value B2 in the shortest time of 17 minutes (see FIG. 15). Further, in various types of battery chargers, even a battery charger capable of quickly charging a battery in, for example, 20 minutes or that capable of charging a battery in one hour, it is possible to charge the battery so that the battery temperature at the time of the completion of charge may become the target temperature value which the battery is intended to reach (the lowest temperature).

Furthermore, in the battery charging method in the third embodiment, battery charge is conducted based on the data stored in the battery packs. Due to this, it is possible to easily change the usage of the battery packs or to newly design battery packs and to allow even a battery charger of an old type to conduct optimum charge control based on the newest data.

Figure 16:
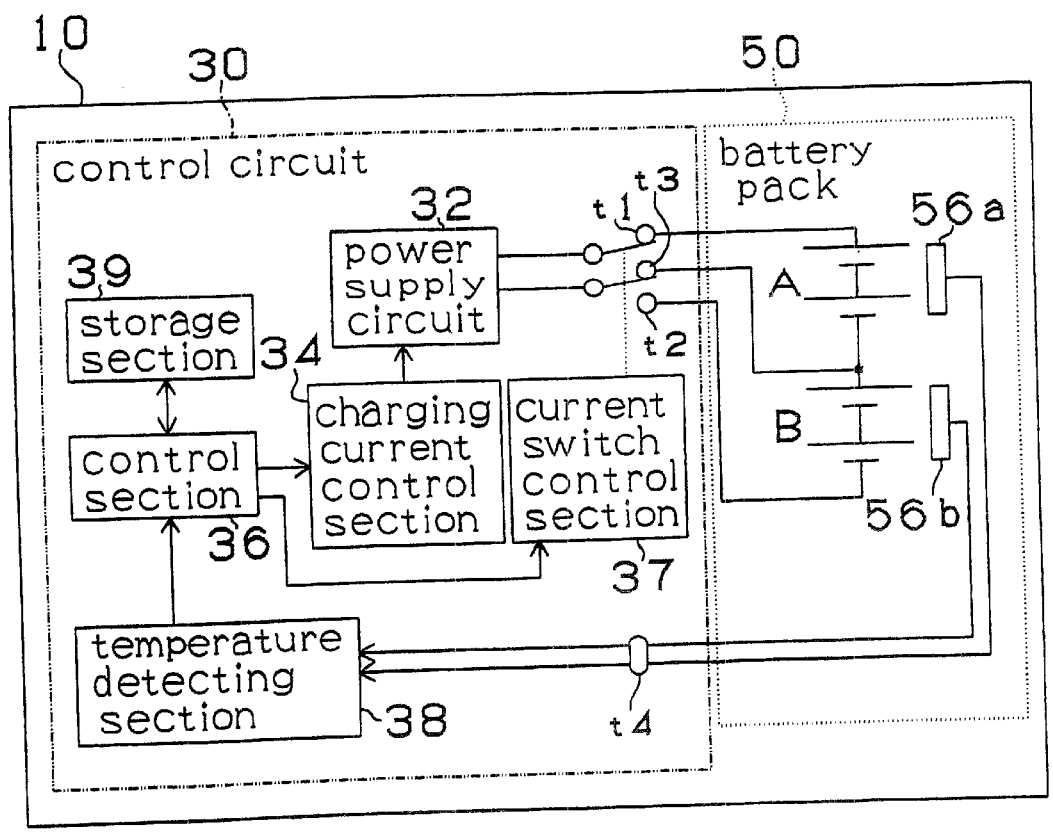
FIG. 16 is a block diagram showing a control circuit in the battery charger shown in FIG. 1.

FIG. 16 shows the configurations of a control circuit 30 and the battery pack 50 in the battery charger 10. The battery pack 50 houses 20 1.2V nickel metal hydride battery cells and can thereby output 24V between the first terminal t1 and the second terminal t2. The intermediate terminal t3 is provided between the first to tenth battery cells and the eleventh to 20th battery cells. By applying a voltage between the first terminal t1 and the intermediate terminal t3, the first to tenth battery cells (to be referred to as "block A" hereinafter) can be charged. Also, by applying a voltage between the intermediate terminal t3 and the second terminal t2, the eleventh to 20th battery cells (to be referred to as "block B" hereinafter) can be charged.

On the other hand, the control circuit 30 of the battery charger 10 consists of a temperature detecting section 38 detecting battery temperatures from output values obtained from temperature sensors (thermistors) 56a (block A-side sensor) and 56b (block B-side sensor), a storage section 39 storing current value control information such as a map to be described later, a control section 36 differentiating the temperature values outputted from the temperature detecting section 38, obtaining a temperature rise value, obtaining a current value with which battery cells are chargeable while suppressing the temperature rise value and outputting the current value as a current command value to a charging current control section 34, the charging current control section 34 controlling a power supply circuit 32 based on the current command value from the control section 36 and adjusting battery charging current, the power supply circuit 32 applying a voltage between the first terminal t1 and the intermediate terminal t3 of the battery pack 50 to thereby charge the block A or applying a voltage between the intermediate terminal t3 and the second terminal t2 to thereby charge the block B, and a current switch control section 37 switching battery charge by the power supply circuit between the block A and the block B.

Now, the configuration of a map used for current control as stated above will be described with reference to FIG. 17.

Normally, if charging current for a battery cell increases, charging time becomes shorter and temperature rise becomes larger. Conversely, if charging current decreases, charging time becomes longer and temperature rise becomes smaller. A nickel metal hydride battery cell, in particular, has characteristics that a temperature gradient (temperature rise value) varies greatly with charging current and the already charged capacity. Due to this, in this embodiment, battery charge is conducted while changing current values so as to suppress temperature rise. In other words, the conventional battery charger charges a battery with a fixed current value, whereas the battery charger in this embodiment determines the state of a battery cell based on the absolute temperature and a temperature rise value and charges the battery cell while changing current values as high as possible with which the temperature rise of the battery cell can be suppressed, that is, while changing current values according to the state of the battery cell.

In this embodiment, if battery temperature is high, relatively low charging current is applied to the battery cell. If the battery temperature is low, relatively high charging current is applied to the battery cell. Also, if temperature rise is large, relatively low charging current is applied to the battery cell. If temperature rise is small, relatively high charging current is applied to the battery cell.

The map is provided to conduct variable-control for the current as stated above and to specify an optimum current value. In the map, the horizontal axis indicates the absolute temperature T and the vertical axis indicates a change in temperature dT/dt. Namely, if battery temperature is high and temperature rise is large (lower right in the map), relatively low charging current is applied to the battery cell. If battery temperature is high and temperature rise is small (upper right in the map), medium charging current is applied to the battery cell. If battery temperature is low and temperature rise is large (lower left in the map), medium charging current is applied to the battery cell. If battery temperature is low and temperature rise is small (upper left in the map), relatively high charging current is applied to the battery cell. In short, optimum current values are set in the respective regions in the map so as to satisfy both a target charging time (about 20 minutes) and a target temperature which the battery cell reaches.

If a battery cell is charged with high current at low temperature (0° C. or lower), battery performance deteriorates. Due to this, it is desirable to set low current values in the left row of the map so as not to deteriorate battery performance.

A suited region is retrieved from the absolute temperature T of the battery and a change in temperature dT/dt during battery charge based on this map. Charging current is then controlled based on a current value specified in the region. For instance, if battery temperature is between T3 and T4 and a change in battery temperature (or a temperature rise value) is between X1 and X2, then a current value in a region I24 is outputted.

Furthermore, the battery charger in this embodiment detects the completion of battery charge based on the movement of regions in the map. That is, the battery charger according to the conventional technique detects the completion of battery charge by monitoring either temperature or voltage while charging current is set at a fixed level. More specifically, the conventional battery charger detects a temperature rise value, a change in voltage and the decrease of voltage after the battery cell is fully charged, thereby determining that the battery cell is fully charged. In the battery charger in this embodiment, by contrast, charge target battery cells are switched between the block A and the block B and charging current is changed as stated above. Due to this, the battery charger in this embodiment cannot detect the completion of battery charge only by monitoring a temperature and a change in temperature or a voltage and a change in voltage. In this embodiment, therefore, the battery charger detects the completion of battery charge based on the movement of the regions in the map.

During battery charge, the charging current value moves apparently at random in the regions of the map according to the change of the temperature and that of the temperature rise value. Namely, before the battery cell is fully charged, if temperature increases or temperature rise increases and a relatively small charging current region is selected, that is, if the lower right region in the map shown in FIG. 5 is selected, then temperature rise becomes smaller by the decrease of current and a charging current value corresponds to that in upper regions on the map.

However, as the battery cell is close to a fully charged state, a temperature rise value increases due to the characteristics of the nickel metal hydride battery cell. That is to say, while a lower region in the map is selected because of large temperature rise and relatively low current is applied to the battery cell, temperature rise remains large. Based on this principle, the battery charger in this embodiment makes measurements in a predetermined cycle (e.g., several hundred seconds' cycle). In a case where regions in which temperature rise is large and in which temperature is high and temperature rise is medium, as hatched in the map, and are selected with high frequency, it is determined that battery charge is completed.

This battery charger gives weight to the map regions so as to appropriately determine the completion of charge. That is, "1" is added to regions (1), i.e., I42, I43, I34, I35 and I36 which tend to occur in the initial charge completion period. To regions (2), i.e., I51, I52, I53, I44, I45, I46, I54, I55 and I56 which tend to occur in the medium charge completion period, "2" is added. To regions (3), i.e., I61, I62, I63, I64, I65 and I66 which tend to occur in the final charge completion period, "3" is added. By doing so, it is detected that the battery cell can be accurately charged up to a target capacity.

Figure 18:
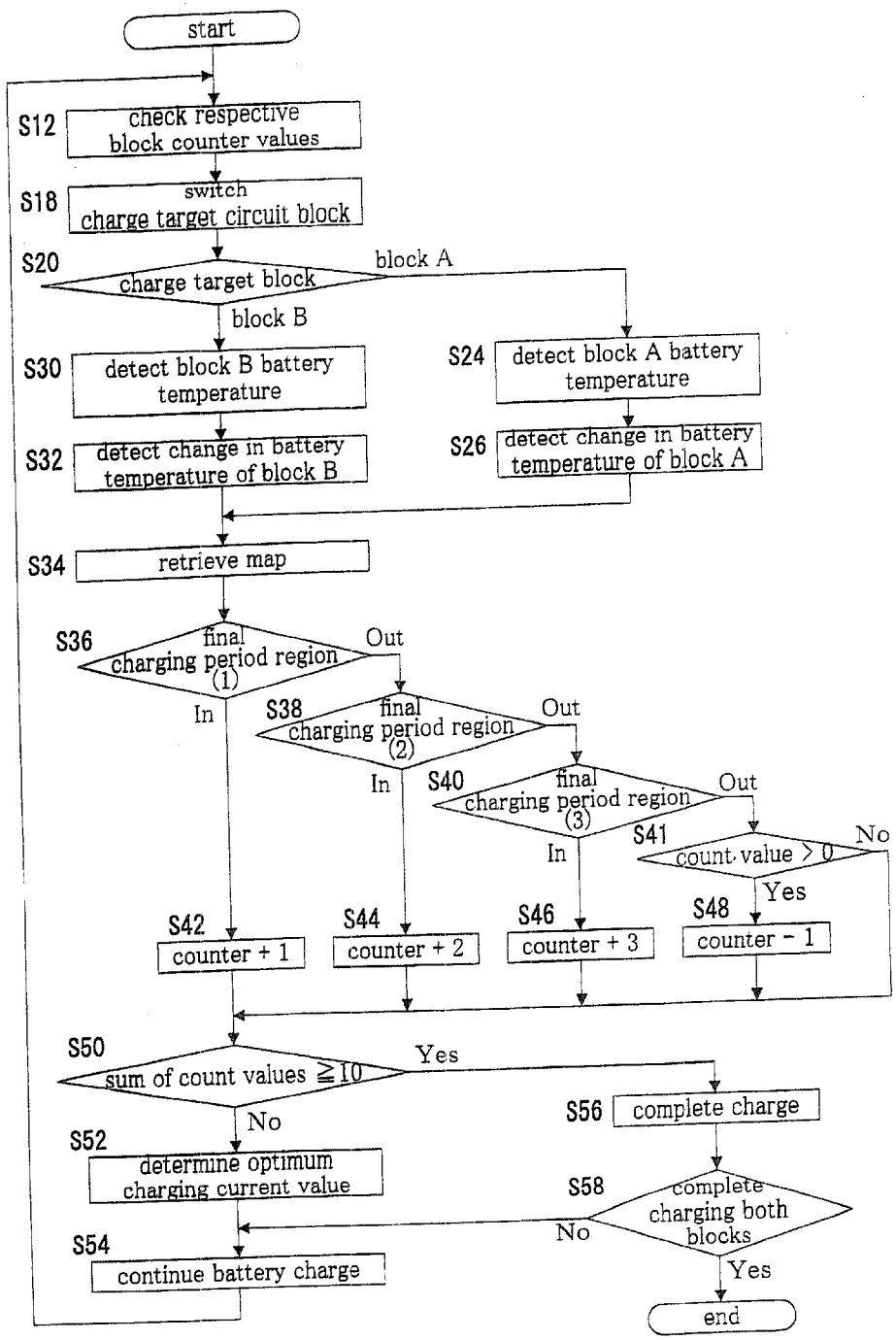
FIG. 18 is a flow chart showing the processing of the control circuit in the first embodiment.

The specific processing by the battery charger in this embodiment will be described based on the flow chart of FIG. 18.

When battery charge starts, the control section 36 of the control circuit (see FIG. 16) adjusts charging current and determines the completion of battery charge in a predetermined cycle (in this case, a 100-second cycle for convenience; actually shorter cycle, i.e., a cycle of not more than 10 seconds). First, the value of a block A counter indicating the progress of the charge of the block A (first to tenth battery cells) and that of a block B counter indicating the progress of the charge of the block B (eleventh to 20th battery cells) are checked (in S12) and it is determined which is set as a charge target block, the block A or the block B (in S20). If the block A is set as a charge target block, the processing goes to a step 24, where the absolute temperature T of the nickel metal hydride battery cells in the block A is detected (in S24). Next, the inputted absolute temperature T is differentiated and a change in battery temperature dT/dt is calculated (in S26). Based on the absolute temperature T and the change in temperature dT/dt and referring to FIG. 5, an optimum charging current is selected from the above-stated map (in S34). In an initial charging period, the absolute temperature T is low and the change in temperature dT/dt is small, so that a relatively high current is retrieved.

Thereafter, the control section 36 determines whether the state of battery charge enters the final charging period regions of the map in steps 36 to 48. The control section 36 then determines whether a count value exceeds 10 ("No" in S50) and the block A is charged with the value retrieved in the step 34 (in S52 and S54).

When a predetermined time (20 seconds) pass, the charge target block is switched (in S18). In this embodiment, the control section 36 controls the current switch control section 37, whereby the charged terminals of the power supply circuit 32 are switched from the first terminal t1—intermediate terminal t3 to the intermediate terminal t3—the second terminal t2 and the block B charge is started (in S30 and S32). When a predetermined time (20 seconds) passes, the block A charge is started (in S18).

While alternately switching the charge target block between the blocks A and B, charge is conducted for 20 seconds apiece. In the final charging period, if the battery temperature and the battery temperature change value are in the regions which tend to occur in the initial charge completion period (final charging period region (1), i.e., I42, I43, I34, I35 and I36 ("In" in S36), the block A counter is incremented by "1" while block A is being charged and the block B counter is incremented by "1" while block B is being charged (in S42). If they are in the regions which tend to occur in the medium charge completion period (final charging period region (2)), i.e., I51, I52, I53, I44, I45, I46, I54, I55 and I56 ("In" in S38), the counter is incremented by "2" (in S44). Further, if they are in the regions which tend to occur in the final charge completion period (final charging period region (3)), i.e., I61, I62, I63, I64, I65 and I66 ("In" in S40), the counter is incremented by "3" (in S46). Then, it is determined whether the sum of count values exceed a preset value (10) (in S50). If the battery temperature and the battery temperature change value continuously belong to the above-stated final charging period regions and the sum of the count values exceeds the preset value of 10 ("Yes" in S50), then the charge of the relevant block (e.g., the block A) is completed (in S56). Thereafter, until the charge of the block B is completed, i.e., the block B counter becomes 10 ("No" in S58), battery charge is continued (in S54). If the charge of the block B is completed ("Yes" in S58), charge processing is completed.

The battery charger in one embodiment employs a map in which an allowable current value with which battery cells can be charged while the battery temperature rise is being suppressed is mapped based on battery temperature values and battery temperature rise values. That is, the map is retrieved, the allowable current value with which the battery cells can be charged while the battery temperature rise is being suppressed, is obtained and the battery cells are then charged with the allowable current value. This makes it possible to charge the nickel metal hydride battery cells, which temperature tends to increase during battery charge, in a short time without causing deterioration due to temperature rise. Since the divided battery cells are alternately switched, i.e., the battery cells in one block are charged while those in the other block are being cooled, it is possible to efficiently charge battery cells even just before the completion of battery charge. Furthermore, the battery charger in this embodiment can charge serial battery cells with the power supply of half an output voltage.

Particularly, charge completion is determined based on whether or not the temperature rise value is relatively high and the frequency, with which a relatively low allowable current value is outputted from the map, is high, i.e., whether or not temperature rise is large and temperature rise is still large even with a charging current value being lowered. Due to this, it is possible to 100% charge the battery cells without overcharge. Further, since this battery charger determines the completion of charge by dividing battery cells, it is possible to accurately determine the completion of charge compared with a case of simultaneously determining it for all battery cells. That is, although the temperature of the nickel metal hydride battery cells tends to rise during battery charge and the battery pack including many battery cells tends to accumulate heat inside, it is possible to properly determine the completion of charge of the battery pack 50. Besides, since battery charge is conducted by dividing battery cells, the temperatures of the battery cells in the battery pack are less irregular and all the cells can be charged to a uniform capacity to thereby lengthen battery life.

Next, a battery charger in the second embodiment according to the present invention will be described with reference to FIGS. 19 to 21.

Figure 19A:
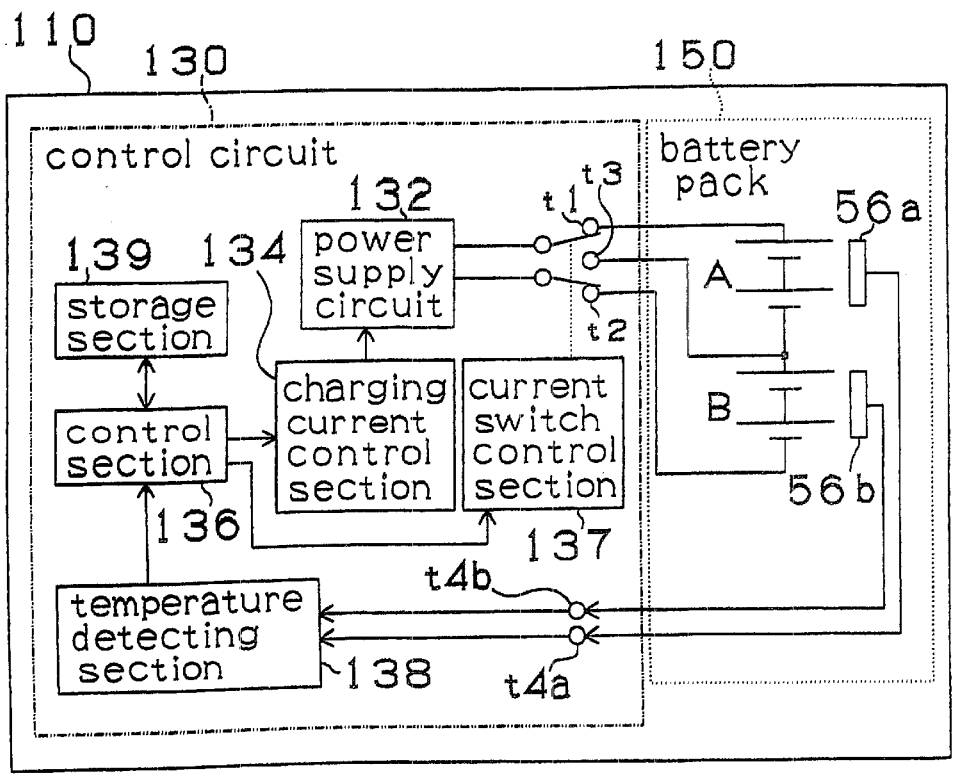
FIGS. 19A and 19B are block diagrams showing a control circuit in a battery charger in the second embodiment.
Figure 19B:
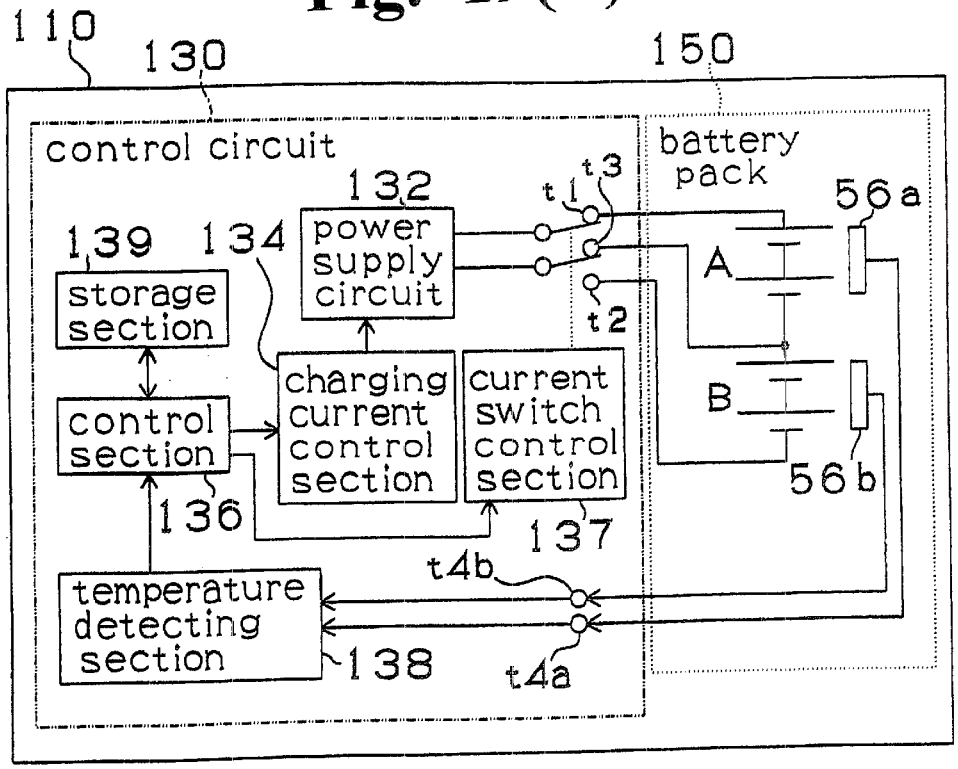
Figure 20:
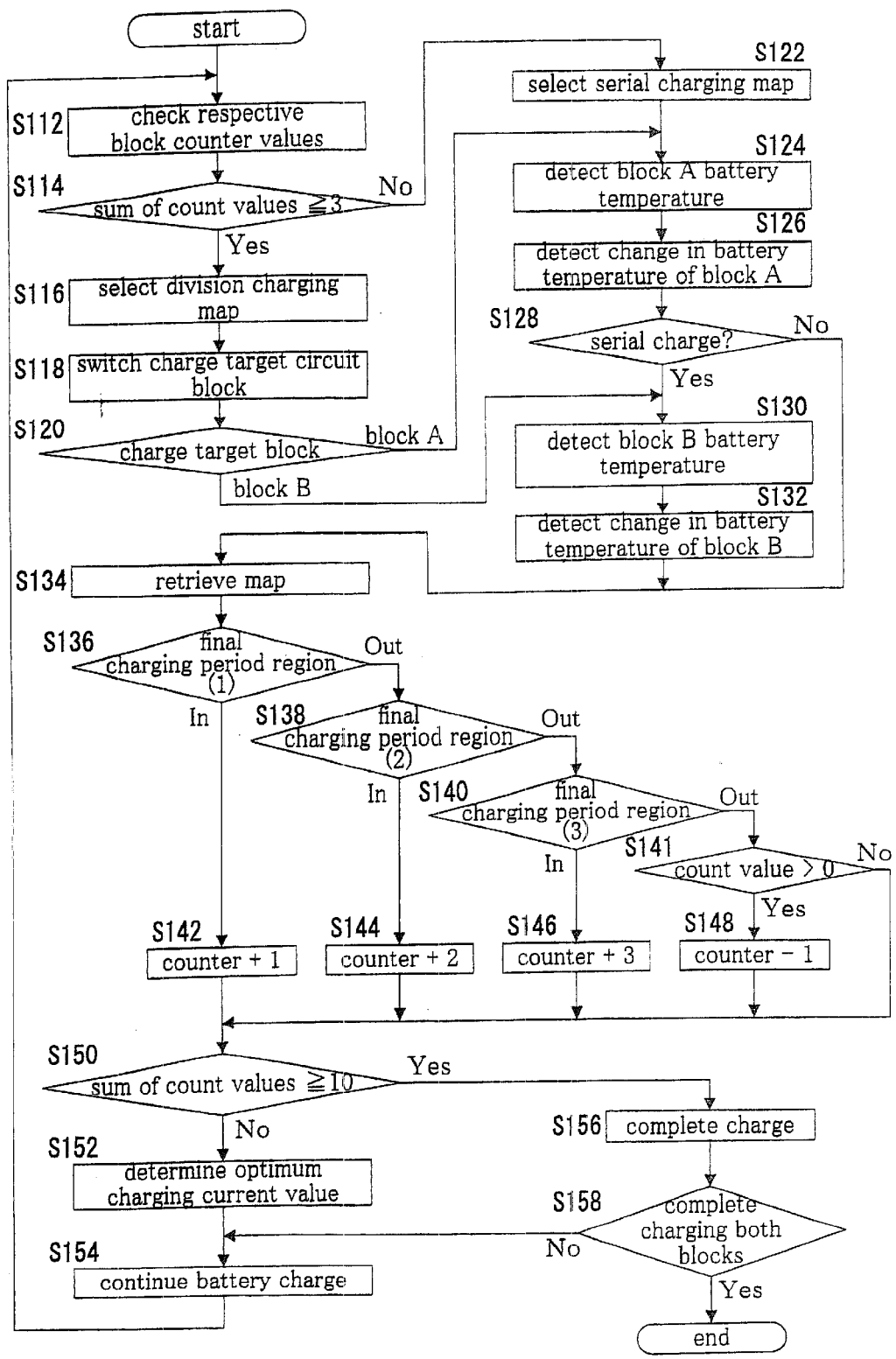
FIG. 20 is a flow chart showing processing of the control circuit in the second embodiment.

FIG. 19 shows the configuration of a battery charger 110 in the second embodiment. The battery charger in the embodiment which has been described above with reference to FIG. 16 charges battery cells after dividing the battery pack 50 into the block A and the block B. The battery charger 110 in the second embodiment, by contrast, charges the overall battery pack 50, i.e., simultaneously charges battery cells in the block A and those in the block B at the start of battery charge as shown in FIG. 19(A). In the final charging period, as shown in FIG. 19(B), the battery cells in the block A and those in the block B are separately charged. (FIG. 19(B) shows a state in which the block A is being charged.) Namely, a power supply circuit 132 in the second embodiment is constituted to switch potential between a potential of 36V for charging the battery pack with rated 24V and a potential of 18V for charging the battery pack (blocks A and B) with 12V. The battery charger in the second embodiment is provided with a temperature sensor 56a for detecting battery temperatures in the block A and a temperature sensor 56b for detecting battery temperatures in the block B.

Figure 21:
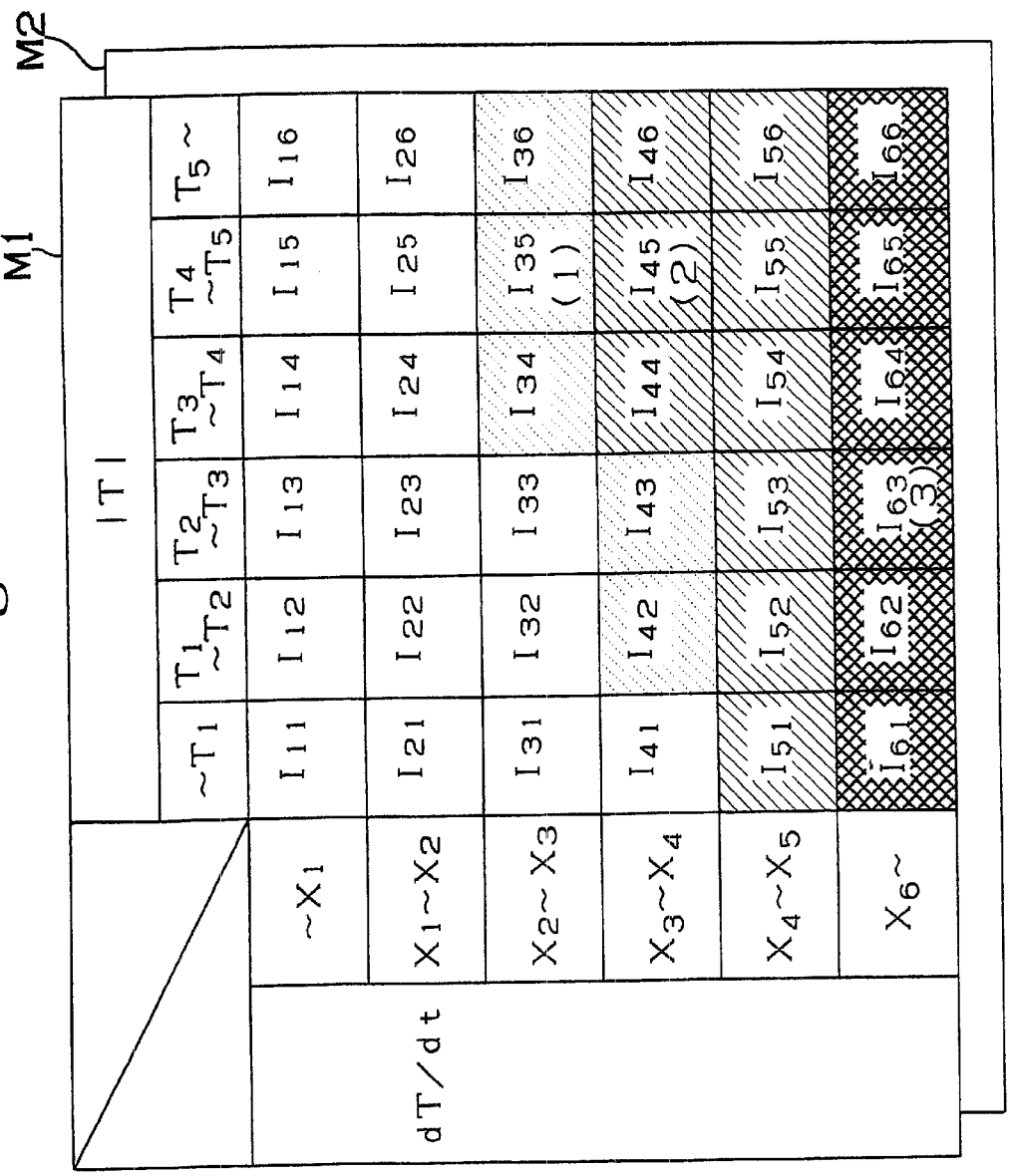
FIG. 21 is an explanatory view for the contents of maps held by the control circuit in the second embodiment.

FIG. 21 shows the contents of maps held by a storage section 139 in the battery charger in the second embodiment. In the above-stated first embodiment, only one map is held for charge control for the blocks A and B. The battery charger in this embodiment includes a map M1 for separately charging the block A and the block B and a map M2 for simultaneously charging the blocks A and B.

The charge operation of the battery charger 110 in the second embodiment will be described with reference to the flow chart of FIG. 20.

The control section of a control circuit (see FIG. 19) checks a block A counter indicating the progress of the charge of the block A (first to tenth battery cells) and a block B counter indicating the progress of the charge the block B (eleventh to 20th battery cells) (in S112) and determines whether the sum of the count values is not more than 3, i.e., whether the blocks are in an initial charging period (in S114). In case of the initial charging period ("No" in S114), the processing goes to a step 122, where the map M2 for simultaneously charging both the block A and the block B is selected (in S122). First, the absolute temperature T of nickel metal hydride battery cells in the block A is detected (in S124). Next, the inputted absolute temperature T is differentiated and a change in battery temperature dT/dt is calculated (in S126). If the result of the determination of the step 128 is "Yes", then the absolute temperature T of the nickel metal hydride battery cells in the block B is detected (in S130). Next, the inputted absolute temperature T is differentiated and a change in battery temperature dT/dt is calculated (in S132). Based on the absolute temperature T and the change in temperature dT/dt, an optimum charging current is selected from the above-stated map M2 with reference to FIG. 21 (in S134). In the initial charging period, the absolute temperature T is low and the change in battery temperature dT/dt is small, so that a relatively high current is retrieved.

Thereafter, the control section 136 determines whether the absolute temperature T and the change in temperature dT/dt enter final charging period regions in the map in steps 136 to 148. After it is determined whether the sum of the count values exceeds 10 ("No" in S150), the battery cells are charged with the current value retrieved in the step 134 (in S152 and S154). Here, the serial charge of the blocks A and B continues unless the sum of the count value of the block A and that of the block B exceeds 3 ("No" in S114).

If the charging period is closer to the final charging period and the sum of the count value of the block A and that of the block B exceeds 3 ("Yes" in S114), then charge operation starts to separately charge the block A and the block B. In this case, the map M1 for separate charge shown in FIG. 21 is first selected (in S116) and it is determined which block is set as a charge target block, the block A or the block B (in S120). If the block A is set as the charge target block, the processing goes to a step 124, where the absolute temperature T of the nickel metal hydride battery cells in the block A is detected (in S124). Next, the inputted absolute temperature T is differentiated and a change in battery temperature dT/dt is calculated (in S126). Thereafter, based on the absolute temperature T and the change in temperature dT/dt, an optimum charging current is selected from the above-stated map M1 with reference to FIG. 21 (in S134).

Then, the control section 136 determines whether the absolute temperature and the change in temperature enter final charging period regions in the map in steps 136 to 148. After it is determined whether the sum of the count values exceeds 10 ("No" in S150), the block A is charged with the current value retrieved in the step 134 as shown in FIG. 19(B) (in S152 and S154).

When a predetermined time (20 seconds) passes, the charge target block is switched (in S18). In this case, the control section 136 controls a current switch control section 137, whereby the charge terminals of the power supply circuit 132 are switched from the first terminal t1—the intermediate terminal t3 to the intermediate terminal t3—the second terminal t2 and the charge of the block B is started (in S130 and S132). When a predetermined time (20 seconds) passes, the charge of the block A is started (in S118).

While alternately switching the block between the block A and the block B, battery charge is conducted for 20 seconds apiece. In the final charging period, if the battery temperature and the temperature rise value enter regions which tend to occur in the initial charge completion period (final charging period region (1), i.e., 142, 143, 134, 135 and 136 ("In" in S136), then the block A counter is incremented by "1" during the charge of the block A and the block B counter is incremented by "1" during the charge of the block B (in S142). If they enter regions which tend to occur in the medium charge completion period (final charging period region (2)), i.e., 151, 152, 153, 144, 145, 146, 154, 155 and 156 ("In" in S138), then the counter is incremented by "2" (in S144). Further, if they enter regions which tend to occur in the final charge completion period (final charging period region (3)), i.e., 161, 162, 163, 164, 165 and 166 ("In" in S140), then the counter is incremented by "3" (in S146). In the determination as to whether the sum of the count values exceed a preset value (10) (in S150), if the absolute temperature and the change in temperature continuously enter the above-stated final charging period regions and the sum of the count values exceeds the preset value of 10 ("Yes" in S150), then the charge of the corresponding block (e.g., the block A) is completed (in S156). Then, until the charge of the block B is completed, that is, until the count value of the block B becomes 10 ("No" in S158), battery charge is continued (in S154). Thereafter, if the charge of the block B is completed ("Yes" in S158), charge processing is completed.

The battery charger in another embodiment retrieves the maps based on a battery temperature and a temperature rise value, obtains an allowable current value with which the battery can be charged while the battery temperature rise is being suppressed, and then charges the battery with the allowable current value. This makes it possible to charge the nickel metal hydride battery cells which temperature tends to rise during charge, in a short time without causing deterioration due to temperature rise. Further, since all the battery cells are simultaneously charged at the beginning of battery charge in which lower heat generated and then the battery cells are charged while dividing the battery cells and alternately switching the charge target battery cells, i.e., while cooling those in one block in the final charging period in which high heat is generated, it is possible to efficiently charge the battery cells in a short time.

Particularly, charge completion is determined based on whether or not the temperature rise value is relatively high and the frequency, with which a relatively low allowable current value is outputted from the map, is high, i.e., whether or not temperature rise is large and temperature rise is still large even with a charging current value being lowered. Due to this, it is possible to 100% charge the battery cells without overcharge. Further, since this battery charger determines the completion of charge by dividing battery cells, it is possible to accurately determine the completion of charge compared with a case of simultaneously determining it for all battery cells. That is, although the temperature of the nickel metal hydride battery cells tends to rise during battery charge and the battery pack including many battery cells tends to accumulate heat inside, it is possible to properly determine the completion of charge of the battery pack 50. Besides, since battery charge is conducted by dividing battery cells, the temperatures of the battery cells in the battery pack are less irregular and all the cells can be charged to a uniform capacity to thereby lengthen battery life.

Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments but should be determined by reference to the claims that follow.

What is claimed is:

1. An apparatus comprising:
   a battery pack comprising at least a first block of battery cells, a second block of battery cells, a first battery temperature sensor in communication with the first block of battery cells and a second battery temperature sensor in communication with the second block of battery cells, and
   a battery charger comprising a current supply arranged and constructed to supply charging current to the battery pack and a processor arranged and constructed to (i) calculate battery temperature increase rates based upon signals from the first and second battery temperature sensors, (ii) select charging currents that will be supplied by the current supply to the first and second blocks of battery cells based upon battery temperature and the calculated battery temperature increase rate, and (iii) alternately supply the selected charging currents to the respective first and second block of battery cells.

2. An apparatus as in claim 1, wherein the processor is further arranged and constructed to terminate the supply of charging current to the respective first and second blocks of batteries based upon a determination that relatively low charging currents have been repeatedly supplied to the respective first and second blocks of batteries over a series of intervals.

3. An apparatus as in claim 1, wherein the first and second blocks of battery cells comprise at least one battery selected from the group consisting of nickel metal hydride batteries and nickel cadmium batteries.

4. The method for charging a battery pack comprising at least a first block of battery cells and a second block of battery cells, comprising:
   supplying a first charging current to the first block of battery cells while monitoring battery temperature and battery temperature increase rate of the first block of battery cells,
   adjusting the first charging current based upon the battery temperature and the battery temperature increase rate of the first block of battery cells in order to avoid overheating the first block of battery cells,
   supplying a second charging current to the second block of battery cells while monitoring battery temperature and battery temperature increase rate of the second block of battery cells, and
   adjusting the second charging current based upon the battery temperature and the battery temperature increase rate of the second block of battery cells in order to avoid overcharging the second block of battery cells.

5. A method as in claim 4, further comprising:
   terminating the supply of the first charging current to the first block of battery cells based upon a determination that relatively low charging currents have been repeatedly supplied to the first block of battery cells over a series of intervals, and
   terminating the supply of the second charging current to the second block of battery cells based upon a determination that relatively low charging currents have been repeatedly supplied to the second block of battery cells over a series of intervals.

6. A method for charging a battery pack comprising at least a first block of battery cells and a second block of battery cells, comprising:
   independently monitoring battery temperature and battery temperature increase rate of the respective first and second block of battery cells,
   selecting a first charging current from a look up table using the battery temperature and battery temperature increase rate of the first block of battery cells as indices for the look up table,
   selecting a second charging current from the look up table using the battery temperature and battery temperature increase rate of the second block of battery cells as indices for the look up table,
   alternately supplying the selected charging currents to the first block of battery cells and the second block of battery cells while continuing to monitor the battery temperature and battery temperature increase rate of the first and second blocks of battery cells at frequent intervals,
   selecting a first new charging current from the look up table when the battery temperature and/or the battery temperature increase rate of the first block of battery cells changes, and
   selecting a second new charging current from the look up table when the battery temperature and/or the battery temperature increase rate of the second block of battery cells changes.

7. A method as in claim 6, further comprising
   terminating charging of the first block of battery cells when the battery temperature increase rate of the first block of battery cells is relatively high and relatively low charging current has been supplied to the first block of battery cells at a relatively high frequency, and
   terminating charging of the second block of battery cells when the battery temperature increase rate of the second block of battery cells is relatively high and relatively low charging current has been supplied to the second block of battery cells at a relatively high frequency.

8. A method as in claim 7, wherein the new charging current selection steps further comprise selecting a lower charging current when the battery temperature and/or battery temperature increase rate increases.

9. A method as in claim 8, wherein the new charging current selection steps further comprise selecting a higher charging current when the battery temperature increase rate decreases.

10. A method as in claim 9, wherein the first and second blocks of battery cells comprise at least one battery selected from the group consisting of nickel metal hydride batteries and nickel cadmium batteries.

11. An apparatus adapted to charge a removable battery pack comprising at least a first block of battery cells, a second block of battery cells, a first battery temperature sensor coupled to the first block of battery cells, a second battery temperature sensor coupled to the second block of battery cells, and at least one charging terminal comprising:
    a controller arranged and constructed to couple to the first and second battery temperature sensors and the at least one charging terminal of the removable battery pack, wherein the controller comprises a memory storing a program containing instructions to:

calculate battery temperature and battery temperature increase rate of the first and second blocks of battery cells based upon signals received from the respective first and second temperature sensors, select a first charging current based upon the battery temperature and the battery temperature increase rate of the first block of battery cells and supplying the first charging current to the first block of battery cells, and select a second charging current based upon the battery temperature and the battery temperature increase rate of the second block of battery cells and supplying the second charging current to the second block of battery cells, wherein the first and second blocks of battery cells are alternately charged.

12. An apparatus as in claim 11, wherein the stored program further comprises instructions to:

terminate the supply of the first charging current to the first block of battery cells based upon a determination that relatively low charging current has been repeatedly supplied to the first block of battery cells over a series of intervals, and terminate the supply of the second charging current to the second block of battery cells based upon a determination that relatively low charging current has been repeatedly supplied to the second block of battery cells over a series of intervals.

13. An apparatus as in claim 12, wherein the stored program further comprises instructions to terminate the supply of current to the first block of battery cells if the current being supplied to the first block of battery cells falls below a predetermined current value over a series of consecutive intervals.

14. An apparatus as in claim 13, further comprising a look up table comprising a set of allowable charging current values and having battery temperature and battery temperature increase rates as indices, wherein the stored program further comprises instructions to select allowable charging current values based upon the detected battery temperature and the calculated battery temperature increase rate.

15. A battery charger adapted to supply current to a rechargeable battery pack comprising a first block of battery cells, a second block of battery cells, a first temperature sensor coupled to the first block of battery cells, a second temperature sensor coupled to the second block of battery cells, a first charging terminal and a second charging terminal, comprising:

a source of charging current, a first terminal arranged and constructed to couple to the first battery temperature sensor, a second terminal coupled to the source of charging current and arranged and constructed to conduct charging current via the first charging terminal to the first block of battery cells, a third terminal arranged and constructed to couple to the second battery temperature sensor, a fourth terminal coupled to the source of charging current and arranged and constructed to conduct charging current via the second charging terminal to the second block of battery cells, and a controller coupled to the first and third terminals and the source of charging current, the controller being arranged and constructed to select the amount of charging current supplied to the second and fourth terminals based at least upon battery temperature signals received from the first and third terminals.

16. An apparatus as in claim 15, wherein the controller is further arranged and constructed to independently terminate the supply of charging current to the respective first and second blocks of battery cells based upon a determination that relatively low charging currents have been repeatedly supplied to the respective first and second blocks of battery cells over a series of intervals.

17. An apparatus as in claim 16, further comprising a look up table comprising a set of allowable charging current values, wherein battery temperature and battery temperature increase rates serve as indices to the look up table, and wherein the controller further comprises instructions for selecting allowable charging current values based upon detected battery temperature and a calculated battery temperature increase rate.

18. An apparatus as in claim 17, wherein the controller comprises instructions for stopping the supply of current to the first block of battery cells when the charging current being supplied to the first block of battery cells is repeatedly below a predetermined current value over a plurality of consecutive intervals.

19. A battery charging system for charging a detachable battery pack comprising at least a first block of battery cells and a second block of battery cells, comprising:

first means for detecting a battery temperature and battery temperature increase rate of the first block of battery cells and the second block of battery cells, second means for storing a map of allowable current values based upon the detected battery temperatures and battery temperature increase rates, third means for selecting an allowable charging current from the second means based upon the detected battery temperatures and battery temperature increase rates, and fourth means for alternately supplying the selected allowable charging currents to the respective first and second blocks of battery cells.

20. A battery charging system as in claim 19, further comprising fifth means for terminating the supply of charging current to the first block of battery cells based upon a determination that relatively low charging current has been repeatedly supplied to the first block of battery cells over a series of intervals.

21. A method for charging a battery pack comprising at least a first block of battery cells and a second block of battery cells, comprising:

independently monitoring respective battery temperatures of the first and second block of battery cells, using a processor to select allowable charging currents based upon detected battery temperatures of the respective first and second blocks of battery cells, alternately supplying selected charging currents to the respective first and second blocks of battery cells while continuing to independently monitor the battery temperatures of the respective first and second blocks of battery cells, and independently adjusting the selected charging currents based upon changes in the detected battery temperatures of the respective first and second blocks of battery cells.

22. A method as in claim 21, further comprising terminating the supply of charging currents to the first block of battery cells when the battery temperature of the first block of battery cells is relatively high and a relatively low charging current has been supplied to the first block of battery cells over a plurality of consecutive intervals.

23. A method as in claim 22, further comprising independently terminating the supply of charging currents to the second block of battery cells when the battery temperature of the second block of battery cells is relatively high and a relatively low charging current has been supplied to the second block of battery cells over a plurality of consecutive intervals.

24. An apparatus for charging a battery pack comprising at least a first block of battery cells and a second block of battery cells, comprising:

- means for independently monitoring respective battery temperatures of the first and second block of battery cells,
- a processor for selecting allowable charging currents based upon detected battery temperatures of the respective first and second blocks of battery cells,
- means for alternately supplying selected charging currents to the respective first and second blocks of battery cells while continuing to independently monitor the battery temperatures of the respective first and second blocks of battery cells, and
- means for independently adjusting the selected charging currents based upon changes in the detected battery temperatures of the respective first and second blocks of battery cells.

25. An apparatus as in claim 24, further comprising means for terminating the supply of charging currents to the first block of battery cells when the battery temperature of the first block of battery cells is relatively high and a relatively low charging current has been supplied to the first block of battery cells over a plurality of consecutive intervals.

26. An apparatus as in claim 25, further comprising means for independently terminating the supply of charging currents to the second block of battery cells when the battery temperature of the second block of battery cells is relatively high and a relatively low charging current has been supplied to the second block of battery cells over a plurality of consecutive intervals.

* * * * *